(12) United States Patent
Kasamatsu et al.

(10) Patent No.: US 12,069,212 B2
(45) Date of Patent: Aug. 20, 2024

(54) IMAGE RECORDING APPARATUS WITH CUTTER AND CORRESPONDING ICON ON A DISPLAY SCREEN

(71) Applicant: BROTHER KOGYO KABUSHIKI KAISHA, Nagoya (JP)

(72) Inventors: Daisuke Kasamatsu, Chita (JP); Shunsuke Minamikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/049,765

(22) Filed: Oct. 26, 2022

(65) Prior Publication Data
US 2023/0171353 A1 Jun. 1, 2023

(30) Foreign Application Priority Data

Nov. 26, 2021 (JP) .................................. 2021-192177

(51) Int. Cl.
*H04N 1/00* (2006.01)
(52) U.S. Cl.
CPC ....... *H04N 1/00424* (2013.01); *H04N 1/0057* (2013.01); *H04N 1/00676* (2013.01)
(58) Field of Classification Search
None
See application file for complete search history.

(56) References Cited

U.S. PATENT DOCUMENTS

| | | | | |
|---|---|---|---|---|
| 2009/0168094 A1* | 7/2009 | Horiuchi | ............... | G06F 3/1204 358/1.15 |
| 2010/0053680 A1* | 3/2010 | Sato | ....................... | G06F 3/1264 358/1.15 |
| 2011/0216373 A1* | 9/2011 | Sugimoto | .......... | H04N 1/00567 358/3.26 |
| 2012/0154862 A1* | 6/2012 | Wakana | ................. | G06K 15/16 358/1.15 |

(Continued)

FOREIGN PATENT DOCUMENTS

| JP | H09-022153 A | 1/1997 |
|---|---|---|
| JP | 2020-168784 A | 10/2020 |

OTHER PUBLICATIONS

US Office Action dated May 8, 2023 from related U.S. Appl. No. 18/058,350, filed Dec. 23, 2022.

*Primary Examiner* — Akwasi M Sarpong
*Assistant Examiner* — Pawan Dhingra
(74) *Attorney, Agent, or Firm* — Scully, Scott, Murphy & Preser, P.C.

(57) ABSTRACT

An image recording apparatus includes a conveyor configured to convey a sheet in a conveying direction, an image recording engine configured to record an image on the sheet, a cutter configured to cut the sheet, a reader configured to read an image on a medium, an operation interface, a display, and a controller. The controller executes reading an image on the medium with the reader, recording an image on the medium which is read in the reading on the sheet with the image recording engine, cutting the sheet at a prescribed position in the conveying direction with the cutter, and (Continued)

displaying a first screen on the display before executing the reading, the recording, and the cutting. The first screen includes a first icon representing the medium to be read with a rectangle and a second icon representing the cut sheets with at least portions of at least two rectangles.

17 Claims, 15 Drawing Sheets

(56) References Cited

U.S. PATENT DOCUMENTS

| | | | |
|---|---|---|---|
| 2020/0177735 A1* | 6/2020 | Tsukada | H04N 1/00501 |
| 2021/0058528 A1* | 2/2021 | Deleverio | H04N 1/00413 |
| 2021/0300082 A1* | 9/2021 | Namba | B41J 13/0036 |
| 2022/0247879 A1* | 8/2022 | Maruyama | H04N 1/00413 |
| 2023/0169291 A1 | 6/2023 | Kasamatsu et al. | |
| 2023/0199129 A1* | 6/2023 | Noda | H04N 1/00482 358/1.13 |

* cited by examiner

IMAGE RECORDING APPARATUS WITH CUTTER AND CORRESPONDING ICON ON A DISPLAY SCREEN

REFERENCE TO RELATED APPLICATIONS

This application claims priority from Japanese Patent Application No. 2021-192177 filed on Nov. 26, 2021. The entire content of the priority application is incorporated herein by reference.

BACKGROUND ART

The present disclosure relates to image recording apparatuses including a cutter configured to cut a recording medium.

An image recording apparatus having a cutter configured to cut a sheet inside a housing is known. In such image recording apparatus, an image processor generates image data based on a job received from a client device, a controller determines consistency between a cutting profile set by a user and the image data, and when it is determined that there is consistency, the controller causes the image forming apparatus to execute a printing process and a cutting process.

DESCRIPTION

In the image recording apparatus described above, in order to cut a printed sheet at an appropriate position, it is necessary for a user to operate a display operation interface to set a cutting profile while checking the display operation interface. However, as an image recording apparatus configured to cut a printed sheet, it is also conceivable that an image of a medium read in a reading process is to be recorded on a sheet to be cut according to a preset cutting profile. In such an apparatus, it is desirable that a user can visually confirm a preview of the image of the medium to be read being recorded on a cut sheet.

According to aspects of the present disclosure, there is provided an image recording apparatus including a conveyor configured to convey a sheet in a conveying direction, an image recording engine configured to record an image on the sheet conveyed by the conveyor, a cutter configured to cut the sheet, a reader configured to read an image on a medium to be read, an operation interface configured to receive user operation, a display, and a controller including hardware. The controller executes reading an image on the medium to be read with the reader, recording an image on the medium to be read which is read in the reading on the sheet with the image recording engine, cutting the sheet at a prescribed position in the conveying direction with the cutter, and displaying a first screen on the display before executing the reading, the recording, and the cutting. The first screen includes a first icon representing the medium to be read with a first rectangle and a second icon representing the cut sheets with at least portions of at least two rectangles including a second rectangle and a third rectangle.

An imaginary preview of the medium to be read by the reader and the cut sheet can be confirmed by the first icon and the second icon on the display before execution of the reading, the recording, and the cutting.

Figure 1:
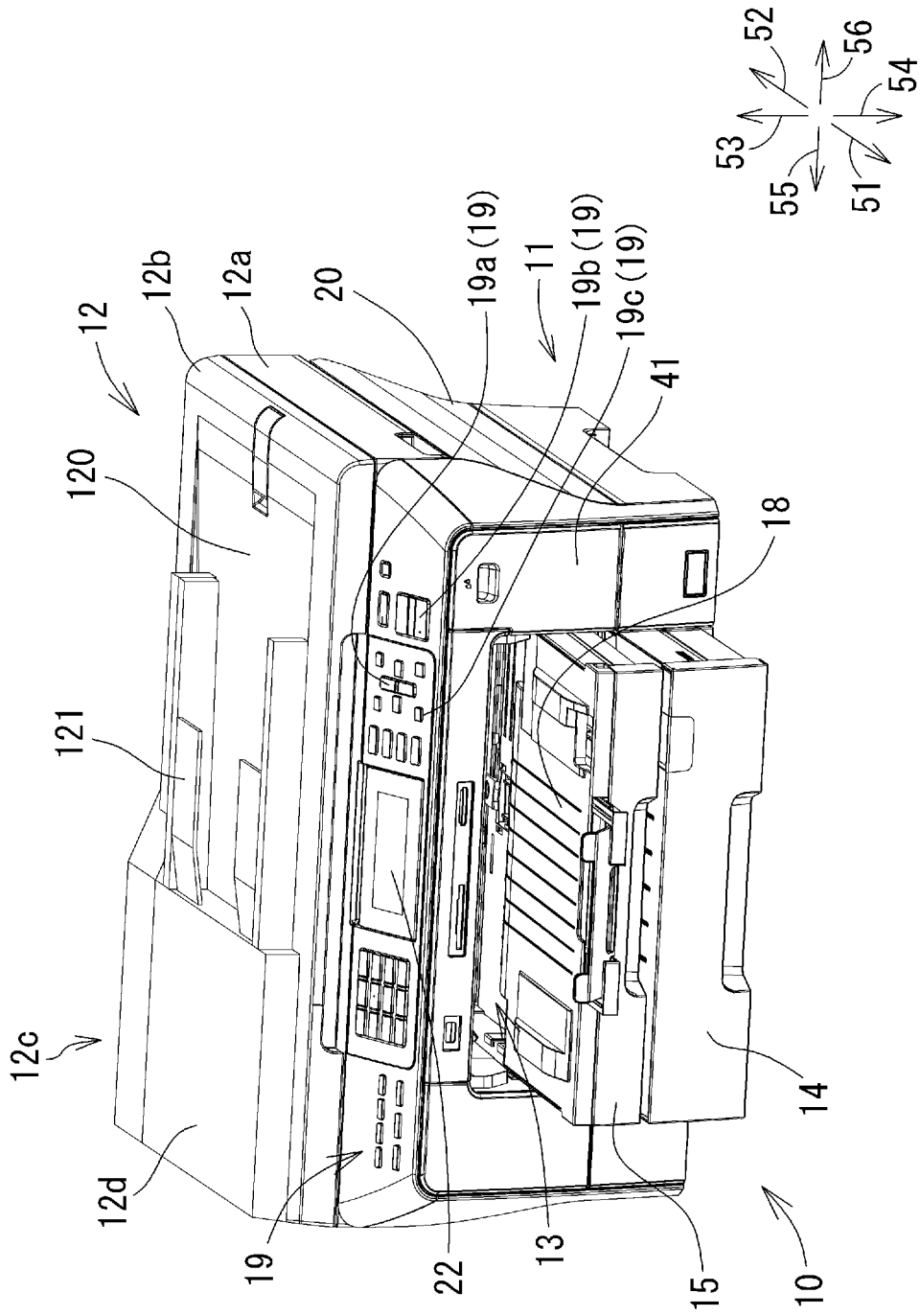
FIG. 1 is an external perspective view of an image recording apparatus according to an embodiment of the present disclosure.

Hereinafter, an embodiment according to aspects of the present disclosure will be described with reference to the drawings. The embodiment described below is merely an example in which the aspects of the present disclosure is embodied, and the embodiment can be modified as appropriate within the scope of the present disclosure.

In the following description, a direction in which an opening 13 of a printer 11 is oriented is referred to as forward 51, and a direction opposite to forward is referred to as backward 52. The forward direction and the backward direction are collectively referred to as a longitudinal direction 51, 52. A vertical direction perpendicular to the longitudinal direction 51, 52 is referred to as a vertical direction 53, 54. A direction perpendicular to the longitudinal direction 51, 52 and the vertical direction 53, 54 is referred to as a lateral direction 55, 56. An upward direction of the vertical direction 53, 54 is referred to as upward 53 and a downward direction is referred to as downward 54. When an image recording apparatus 10 is viewed in the backward 52 direction, the leftward of the lateral direction 55, 56 is referred to as leftward 55, and the rightward is referred to as rightward 56.

It should be noted that screens to be displayed on a later-described LCD 22 are described using directions different from the directions 51, 52, 53, 54, 55 and 56 as a displaying surface of the LCD 22 does not necessarily coincide with a plane defined by two of the directions 51, 52, 53, 54, 55 and 56. Specifically, the screens are described while defining an upper side, a lower side, a left side and right side of each figure as up, down, left and right, and defining the up-down direction and the left-right direction as a vertical direction and a horizontal direction.

As shown in FIG. 1, the image recording apparatus 10 is a multi-function machine including a printer 11 provided in a lower portion and a scanner 12 provided in an upper portion. The image recording apparatus 10 has a printing function, a scanning function, a copying function, and a facsimile function. The image recording apparatus 10 can be used alone or connected to one or more conventionally-known external information device such as a computer, a smartphone, or a tablet.

In the scanning function, image data of an original 9 read by the scanner 12 is transferred to a computer or the like connected to the image recording apparatus 10 by wire or wireless connection. The read image data can also be transferred to various storage media such as a memory card or a Universal Serial Bus (USB) memory and stored therein. In the copying function, the printer 11 records an image on a recording sheet 8 based on the image data of the original 9 read by the scanner 12. In the facsimile function, image data read by the scanner 12 is transmitted by facsimile through a telephone line or the like. Received facsimile data is recorded on a recording sheet 8 by the printer 11. The scanner 12 and the printer 11 are controlled by a controller 100 including hardware.

An operation interface 19 and a liquid crystal display 22 (hereinafter also referred to as an LCD) are provided on an upper front surface of the image recording apparatus 10. The operation interface 19 receives input of information by a user.

A screen is displayed on the LCD 22 so that the user can visually confirm various kinds of information of the image recording apparatus 10. The image recording apparatus 10 operates based on instruction information inputted through operation of the operation interface 19. The controller 100 displays the screen so that the user can confirm each operation on the LCD 22. The operation interface 19 includes a move button 19a configured to receive a user operation for moving a highlighted portion or the like on the screen displayed on the LCD 22, a select button 19b configured to receive a user operation for selecting the highlighted portion, and a clear button 19c configured to receive a user operation for returning to the previous screen or canceling the selection. The move button 19a is a so-called cursor key configured to receive a user operation for inputting movement in the up, down, left and right directions.

Printer 11

Figure 2:
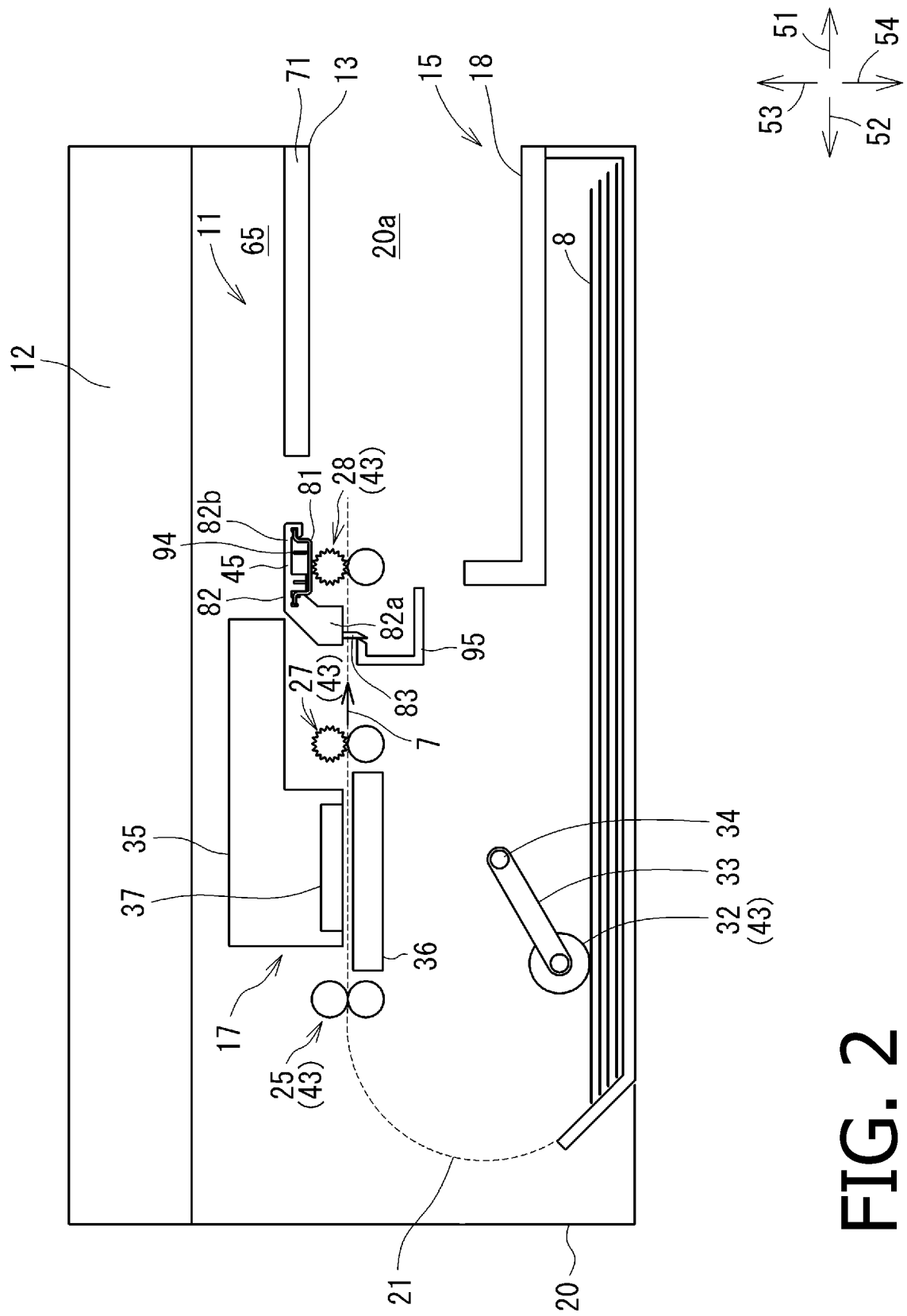
FIG. 2 is a diagram schematically showing a structure of the image recording apparatus.

Hereinafter, a configuration of the printer 11 will be described with reference to FIGS. 1 to 3. In FIG. 2, illustration of a sheet feed cassette 14 is omitted for simplification of description.

As shown in FIGS. 1 and 2, the printer 11 includes a housing 20. The housing 20 includes a sheet feed cassette 14, a sheet feed cassette 15, a recording engine 17, a cutter 45, and other functional parts. An opening 13 is positioned below the operation interface 19 on a front surface of the housing 20. The opening 13 is positioned substantially at the center in the lateral direction 55, 56 on the front surface of the housing 20. The opening 13 is formed in a rectangular shape long in the lateral direction 55, 56. The opening 13 extends from an upper portion to a lower end of the front surface of the housing 20.

The housing 20 has an internal space 20a extending backward 52 from the opening 13. The internal space 20a communicates with a conveying path 21 which will be described later. An upper wall 71 separates the internal space 20a from a substrate accommodating space 65 disposed behind the operation interface 19. The substrate accommodating space 65 accommodates a conventionally-known substrate on which an electronic circuit electrically connected to the operation interface 19 is embedded.

An opening/closing cover 41 is attached on the front surface of the housing 20 at the right side of the opening 13. When the opening/closing cover 41 is opened, a cartridge mounting space is exposed, and ink cartridges 40 storing ink can be mounted to or removed from the housing 20. The ink cartridges 40 supply ink to a recording head 37 of the recording engine 17 through tubes 44.

The sheet feed cassette 14 and the sheet feed cassette 15 can be inserted into and removed from the housing 20 along the longitudinal direction 51, 52. The sheet feed cassette 14 is positioned below the sheet feed cassette 15 when mounted to the housing 20. The sheet feed cassette 15 accommodates a plurality of standard recording sheets 8 in a stacked state. The standard recording sheets 8 are of A3 size, A4 size, B4 size, B5 size, etc. according to the Japanese Industrial Standards. A sheet discharge tray 18 is disposed above the sheet feed cassette 15. The sheet discharge tray 18 supports the recording sheets 8 discharged from the conveying path 21. In the present embodiment, two types of sheet feed cassette, namely, the sheet feed cassette 14 and the sheet feed cassette 15 are provided, but the sheet feed cassette 14 may be omitted.

The sheet feed cassette 15 holds a plurality of recording sheets 8. The recording sheets 8 are held in a stacked state in an internal space of the sheet feed cassette 15. The sheet discharge tray 18 is formed on the front side (right side in FIG. 2) of the image recording apparatus 10. FIG. 2 shows a state in which the sheet feed cassette 15 is inserted into the housing 20.

As shown in FIG. 2, a conveyor 43 configured to convey the recording sheet 8 from the sheet feed cassette 15 to the sheet discharge tray 18 along the conveying path 21 is disposed in the housing 20. The conveying path 21 is a so-called U-turn path which curves upward 53 and forward 51 in a U-shape from the sheet feed cassette 15 and extends linearly forward 51 toward the sheet discharge tray 18. A downstream end of the conveying path 21 communicates with the internal space 20a.

A feed roller 32, a feed roller pair 25, a first discharge roller pair 27, and a second discharge roller pair 28 are arranged along the conveying path 21 in this order from the upstream side in a conveying direction 7 from the sheet feed cassette 15 to the sheet discharge tray 18. The feed roller 32 and the roller pairs 25, 27 and 28 constitute the conveyor 43.

The feed roller 32 is located above the sheet feed cassette 15. The feed roller 32 is provided at a distal end of an arm 33 so as to be rotatable about an axis extending in the lateral direction 55, 56. A proximal end of the arm 33 is rotatable about a shaft 34. Driving force from a feeding motor 113 (see FIG. 5), which is a driving source, causes the feed roller 32 to rotate. When the feed roller 32 rotates, the uppermost recording sheet 8 among a plurality of recording sheets 8 stacked on the sheet feed cassette 15 is fed to the conveying path 21.

The Feed roller pair 25 is positioned in the vicinity of a downstream end of the curved portion of the conveying path 21 in the conveying direction 7. The Feed roller pair 25 is rotatable about an axis extending in the lateral direction 55, 56. The Feed roller pair 25 rotates as driving force of a conveying motor 116 (see FIG. 5) is transmitted to the Feed roller pair 25. The recording sheet 8 is conveyed below the recording head 37 while being nipped between the Feed roller pair 25.

The first discharge roller pair 27 and the second discharge roller pair 28 are positioned along the conveying path 21 downstream of the recording head 37 in the conveying direction 7. The first discharge roller pair 27 is positioned upstream of the second discharge roller pair 28 in the conveying direction 7. The first discharge roller pair 27 and the second discharge roller pair 28 rotate as the driving force of the conveying motor 116 is transmitted to the first discharge roller pair 27 and the second discharge roller pair 28. The recording sheet 8 conveyed by the Feed roller pair 25 is nipped between the first discharge roller pair 27 and the second discharge roller pair 28 and conveyed to the sheet discharge tray 18.

As shown in FIG. 2, the recording engine 17 is positioned along the conveying path 21 between the Feed roller pair 25 and the first discharge roller pair 27. The recording engine 17 records an image on the recording sheet 8 conveyed by the conveyor 43. The recording engine 17 includes a carriage 35 positioned above the conveying path 21, a platen 36 positioned below the conveying path 21, and the recording head 37 mounted on the carriage 35.

Figure 3:
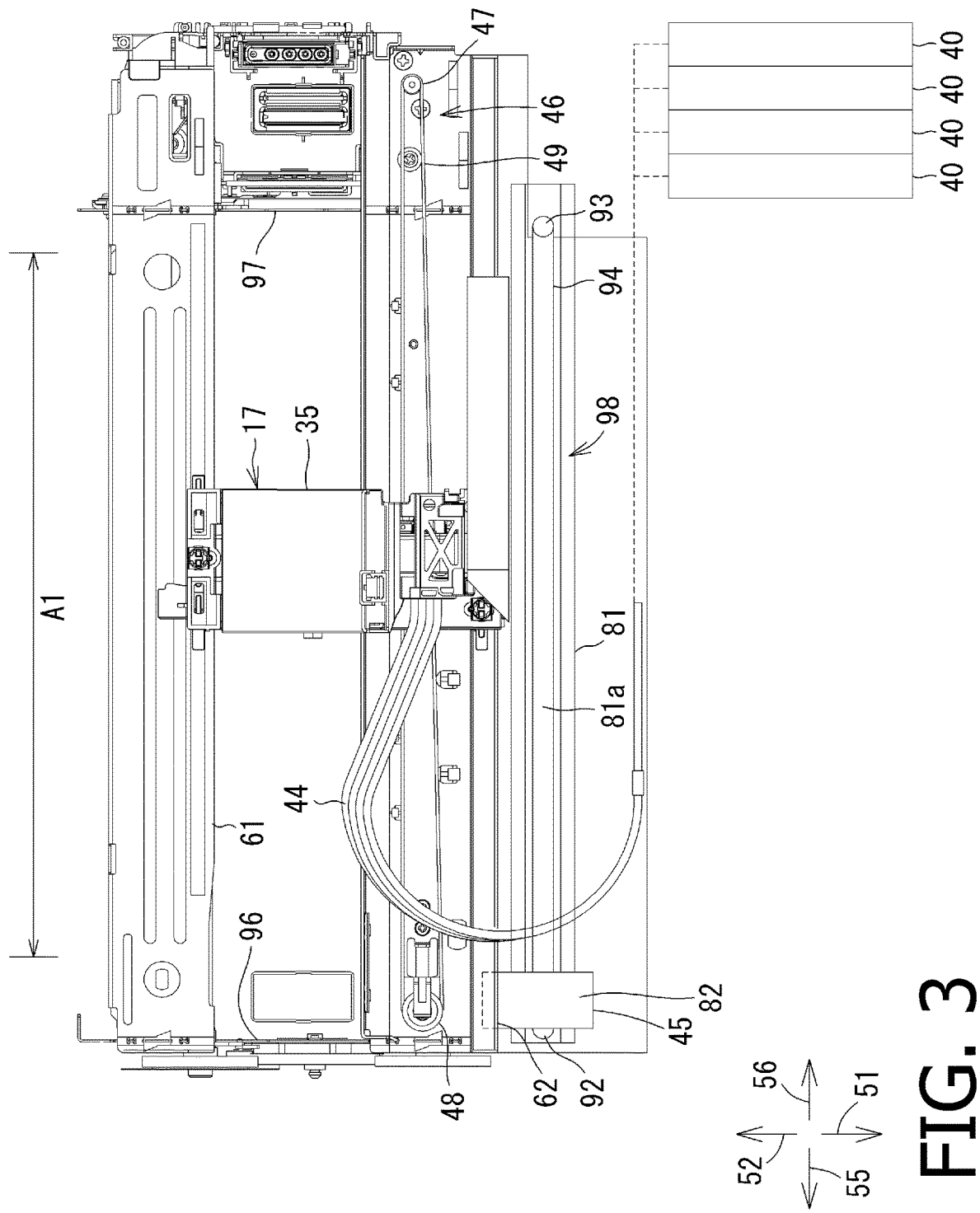
FIG. 3 is a plan view showing a main configuration of the image recording apparatus.

The recording head 37 shown in FIGS. 2 and 3 is a so-called ink-jet system in which inks of cyan (C), magenta (M), yellow (Y) and black (Bk) are supplied from the ink cartridges 40 through the tubes 44, and the inks are ejected as tiny ink droplets. While the carriage 35 is reciprocating in the lateral direction 55, 56, ink droplets are ejected from the recording head 37, whereby an image is recorded on the recording sheet 8 conveyed over the platen 36.

As shown in FIG. 3, the carriage 35 is slidably supported by guide frames 61 and 62 each extending in the lateral direction 55,56 and separated from each other in the longitudinal direction 51, 52. The carriage 35 spans the guide frames 61 and 62 so as to be able to reciprocate in the lateral direction 55, 56.

A belt drive mechanism 46 is disposed on an upper surface of the guide frame 62. In the belt drive mechanism 46, an endless annular belt 49 having teeth on an inner surface thereof is wound around a first pulley 47 and a second pulley 48 which are respectively provided near both ends of the conveying path 21 in the lateral direction 55, 56. The first pulley 47 and the second pulley 48 are disposed at both ends of a region in which the carriage 35 reciprocates, respectively. The first pulley 47 is rotated by driving force input from a CR motor 115 (see FIG. 5), which is a driving source, to a shaft of the first pulley 47. The belt 49 moves circumferentially by the rotation of the first pulley 47, whereby the second pulley 48 is driven to rotate. In place of using the endless annular belt 49, an ended belt may be used by fixing both ends of the ended belt to the carriage 35.

The carriage 35 is fixed to the belt 49. Although the connecting portion between the carriage 35 and the belt 49 is not shown in detail in the drawings, the belt 49 is slightly pulled upward 53 in a state in which the belt 49 is connected to the carriage 35. As a result, tension to elastically return downward 54 is generated in the belt 49, and the carriage 35 is elastically urged toward the guide frames 61 and 62 by this tension. As described above, when the belt 49 moves circumferentially, the carriage 35 reciprocates on the guide frames 61 and 62. The recording head 37 is mounted on this carriage 35 so that the recording head 37 can reciprocate with the lateral direction 55, 56 of the conveying path 21 as a main scanning direction.

Cutter 45

As shown in FIGS. 2 and 3, the cutter 45 is positioned in front of the recording engine 17 above the conveying path 21. The cutter 45 is positioned on the left of an image recording area A1 when stopped. The image recording area A1 is an area defined by a maximum width of a range in which an image can be recorded on the recording sheet 8 by ejecting ink from the recording head 37 reciprocating together with the carriage 35. If the maximum size of the recording sheet 8 that can be recorded using the printer 11 is A4, the image recording area A1 is slightly wider than a width of the A4 size.

The cutter 45 cuts the recording sheet 8 conveyed by the conveyor 43 in the lateral direction 55, 56. The cutter 45 cuts the recording sheet 8 by moving rightward 56 from a stop position on the left of the image recording area A1 (the position of the cutter 45 shown in FIG. 3). For example, one recording sheet 8 of A4 size is cut into two recording sheets 8 of A5 size by the cutter 45. The cutter 45 includes a blade carriage 82 that is supported by a guide rail 81 extending in the lateral direction 55, 56 and fixed to side frames 96 and 97 and is configured to move by being guided by the guide rail 81, a blade 83 that is mounted on the blade carriage 82, and a fixed blade 95. In FIG. 3, the cutter 45 is shown in a simplified manner with the detailed configuration omitted.

The blade carriage 82 includes a blade holder 82a configured to hold the blade 83 and a connecting part 82b connected to the guide rail 81. The blade holder 82a is positioned between the first discharge roller pair 27 and the second discharge roller pair 28. The blade 83 is supported by the blade holder 82a to protrude downward 54 from a lower end of the blade holder 82a. The blade 83 has a disc shape and is supported by the blade holder 82a so as to be rotatable about an axis extending in the longitudinal direction 51, 52.

The connecting part 82b extends forward 51 from the blade holder 82a and is connected to the guide rail 81.

The blade carriage 82 is driven by a drive mechanism 98. The drive mechanism 98 includes a drive pulley 92 and a driven pulley 93 disposed on an upper surface of a substrate 81a, and an endless belt 94 wound around the drive pulley 92 and the driven pulley 93. The drive pulley 92 and the driven pulley 93 are disposed at both ends of the upper surface of the substrate 81a in the lateral direction 55, 56, respectively. The drive pulley 92 and the driven pulley 93 rotate about axes extending in the vertical direction 53, 54. Driving force of a cutting motor 114 (see FIG. 5) is transmitted to the drive pulley 92. The endless belt 94 is connected to the blade carriage 82. When the drive pulley 92 rotates, the endless belt 94 moves circumferentially and the driven pulley 93 is driven to rotate. The circumferential motion of the endless belt 94 causes the blade carriage 82 to reciprocate in the lateral direction 55, 56 along the guide rail 81.

The fixed blade 95 is positioned below the blade holder 82a of the blade carriage 82. The fixed blade 95 is supported by the side frames 96 and 97 and extends in the lateral direction 55, 56 across the image recording area A1. An edge of the fixed blade 95 abuts against the blade 83 from the rear. The recording sheet 8 is cut by being sandwiched between the blade 83 and the fixed blade 95.

Scanner 12

Figure 4:
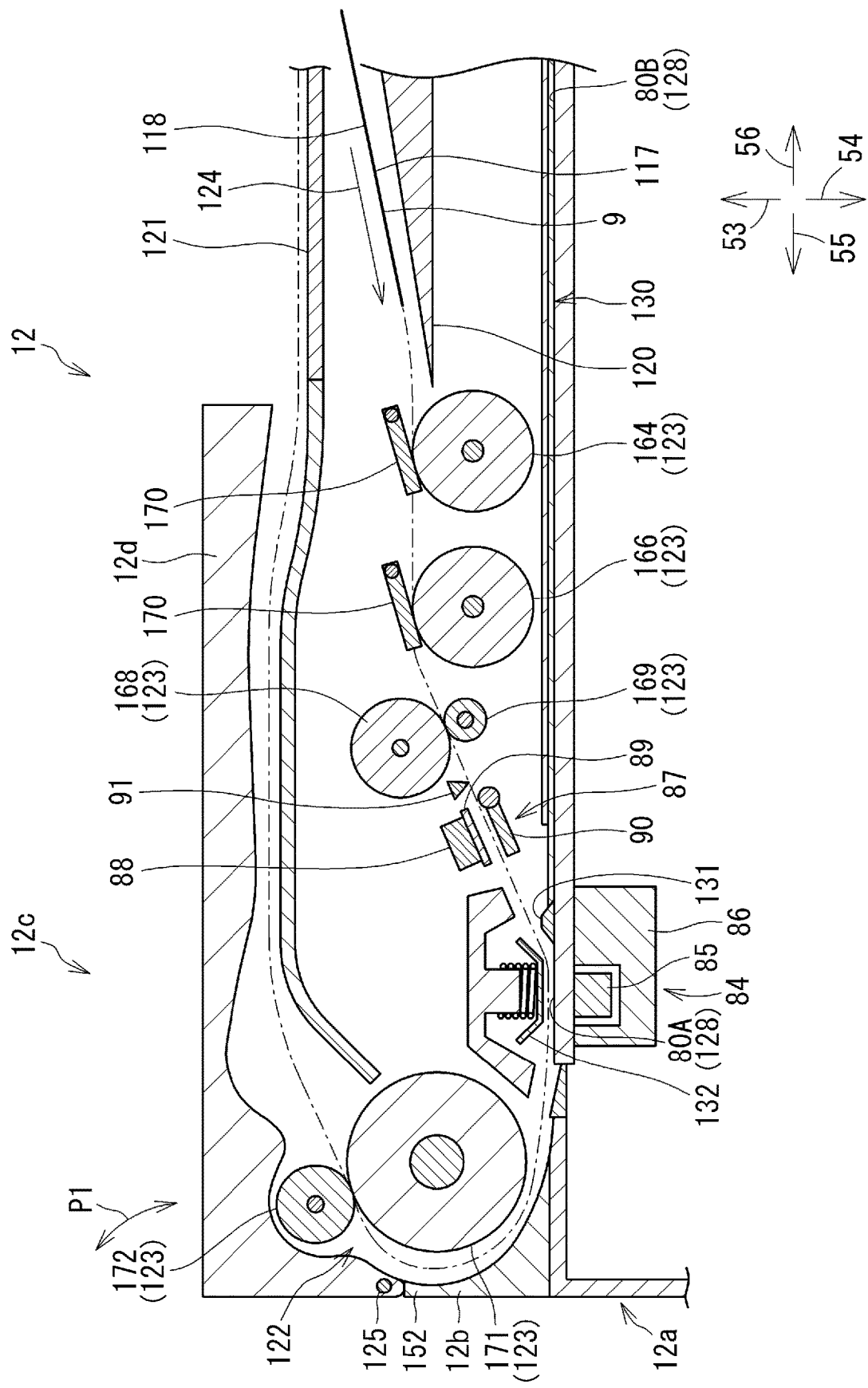
FIG. 4 is a cross-sectional view schematically showing a structure of a scanner of the image recording apparatus.

As shown in FIGS. 1 and 2, the scanner 12 is positioned above the printer 11. The scanner 12 is a so-called flatbed scanner. The scanner 12 includes a scanner main body 12a provided above the printer 11, and an original cover 12b provided above the scanner main body 12a. As shown in FIG. 4, a platen glass 128 on which the original 9 is to be placed is provided on an upper surface of the scanner main body 12*a*. An image sensor capable of optically reading an image of the original 9 on the platen glass 128 is provided inside the scanner main body 12*a*. The original cover 12*b* is provided with an automatic document feeder (ADF) 12*c* which is an automatic conveying mechanism configured to pick up and convey a plurality of originals 9 from which images are to be read one by one. The original 9 may be of the A3 size, the A4 size, the B4 size, the B5 size or the like according to the Japanese Industrial Standards but the present embodiment will be described while using the A4 size as an example.

As shown in FIG. 4, the scanner 12 includes an ADF original tray 120, an ADF discharge tray 121, a conveying path 122, a conveying mechanism 123, a first contact image sensor 85, and a second contact image sensor 88.

The original cover is attached to the scanner main body 12*a* via one or more hinges on the back so as to be freely openable and closable. The original cover 12*b* is movable between an open position and a closed position with respect to the scanner main body 12*a* having the platen glass 128.

The platen glass 128 is provided on the upper surface of the scanner main body 12*a*. When the original cover 12*b* is closed with respect to the scanner main body 12*a*, the platen glass 128 is covered with the original cover 12*b*.

An elastic plate 130 is provided on a lower surface of the original cover 12*b*, that is, on a surface of the original cover 12*b* facing the platen glass 128. The elastic plate 130 abuts against the platen glass 128 when the original cover 12*b* is in the closed position. The elastic plate 130 presses and fixes the original 9 placed on the platen glass 128.

A positioning member 131 defining a reading area 80A for reading an image of the original 9 using the ADF 12*c* and a reading area 80B for using the scanner 12 as a flatbed scanner is provided at a left end of the platen glass 128. The positioning member 131 is a positioning reference for placing the original 9 on the platen glass 128. When using the ADF 12*c*, the positioning member 131 functions as a guide configured to guide the original 9 passing over the reading area 80A to return to the conveying path 122 provided in the ADF 12*c*.

A first image reader 84 is built in the scanner main body 12*a*. The first image reader 84 includes the first contact image sensor (hereinafter referred to as "first CIS") 85 and a CIS carriage 86. The first CIS 85 is positioned at an upstream portion of the conveying path 122 in a conveying direction 124. The first CIS 85 optically reads an image of the original 9 from below the conveying path 122. The first CIS 85 is mounted on the CIS carriage 86. Driving force from a CR motor 108 (see FIG. 5), which is a driving source, causes the CIS carriage 86 to reciprocate below the platen glass 128 together with the first CIS 85.

As shown in FIGS. 1 and 4, the ADF original tray 120 and the ADF discharge tray 121 are superposed on the original cover 12*b* at the upper portion of the scanner 12. The original 9 discharged from the ADF 12*c* is supported by the ADF discharge tray 121 and held separately from the original 9 on the ADF original tray 120.

An ADF cover 12*d* can be rotated in a direction of arrow P1 in FIG. 4 about a rotation shaft 125 provided on a side (left side in FIG. 4) of the ADF 12*c*, and a portion of the inside of the ADF 12*c* can be exposed.

The conveying mechanism 123 configured to convey the original 9 along the conveying path 122 in the conveying direction 124 from the ADF original tray 120 to the ADF discharge tray 121 is provided inside the ADF 12*c*. The conveying mechanism 123 includes a roller, a nip pieces 170, a pinch roller and the like. The conveying mechanism 123 includes first rollers 164 and 166, second rollers 168 and 169, and third rollers 171 and 172.

Hereinafter, a surface of the original 9 placed on the ADF original tray 120 facing downward 54 is referred to as a first surface 117, and a surface facing upward 53 is referred to as a second surface 118.

The configuration of the rollers 164, 166, 168 and 171 (see FIG. 5) is merely an example of the conveying mechanism 123 and thus the number and arrangement of the rollers may be changed, pinch rollers may be used in place of the nip pieces, or other known recording sheet feeding mechanisms may be used.

An original sensor 91 is positioned downstream of the second rollers 168 and 169 in the conveying direction 124. The original sensor 91 detects the original 9 fed by the second rollers 168 and 169. The original sensor 91 detects a leading end and a trailing end of the original 9, whereby it is possible to determine the size of the original 9 when a reading process is performed.

A second image reader 87 is positioned downstream of the original sensor 91 in the conveying direction 124. The second image reader 87 includes the second contact image sensor (hereinafter referred to as "second CIS") 88, a plate-shaped second platen 89, and a document support member 90 configured to support the conveyed original 9. The second image reader 87 reads the second surface 118 of the original 9. The second surface 118 of the original 9 is the upper surface of the original 9 placed on the ADF original tray 120. The second CIS 88 optically reads an image on the original 9 from above the conveying path 122.

The positioning member 131 is positioned downstream of the second image reader 87 in the conveying direction 124. The positioning member 131 guides the original 9 having passed through the second image reader 87 between the platen glass 128 and an original guide 132.

The first image reader 84 is positioned downstream of the positioning member 131 in the conveying direction 124. The first image reader 84 reads the first surface 117 of the original 9. The first surface 117 is a lower surface of the original 9 placed on the ADF original tray 120.

The original guide 132 is provided to the original cover 12*b* at a position facing the first image reader 84. The original guide 132 has a horizontal portion facing the reading area 80A and inclined portions extending upward 53 from both ends of the horizontal portion on the upstream side and the downstream side. The original guide 132 is urged toward the reading area 80A by a spring member fixed to an ADF main body 152.

Figure 5:
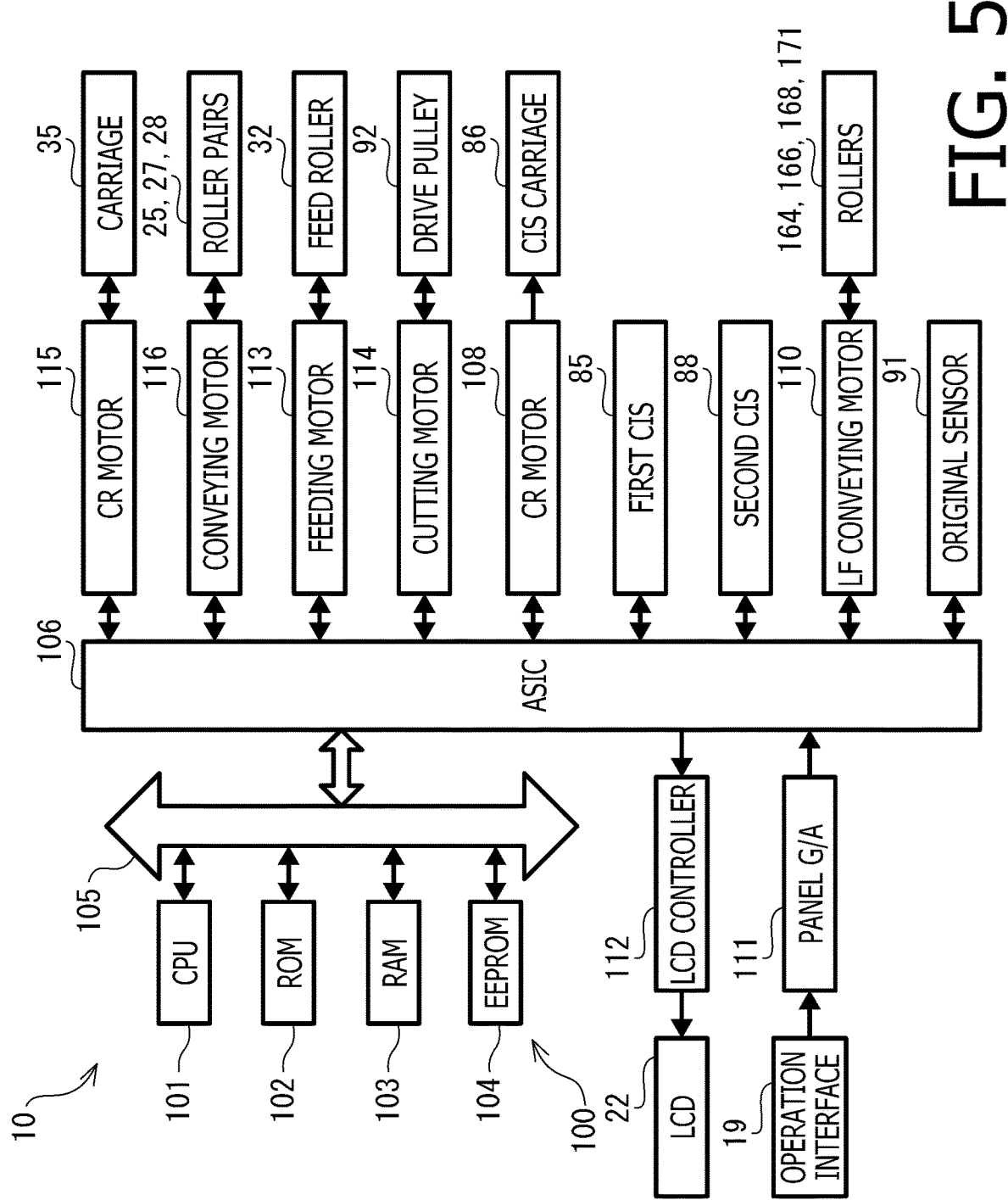
FIG. 5 is a block diagram of the image recording apparatus.

The first rollers 164 and 166, the second roller 168, and the third roller 171 are rotated by driving force transmitted from an LF conveying motor 110 (see FIG. 5).

Configurations of Controller 100 and Devices

FIG. 5 shows a configuration of the controller 100 and its peripheral devices of the image recording apparatus 10. The controller 100 integrally controls the overall operations of the printer 11 and the scanner 12. The controller 100 is configured as a microcomputer mainly including a Central Processing Unit (CPU) 101, a Read Only Memory (ROM) 102, a Random Access Memory (RAM) 103, and an Electrically Erasable and Programmable ROM (EEPROM) 104, and is connected to an Application Specific Integrated Circuit (ASIC) 106 via a bus 105.

The ROM 102 stores programs and the like configured to control various operations of the image recording apparatus 10. The EEPROM 104 stores various data to be used for processing according to the programs. The RAM 103 is used as a storage area for temporarily recording various data used when the CPU 101 executes the programs or as a development area for data and programs.

The CPU 101 integrally controls peripheral devices constituting the controller 100 or controlled devices controlled by the controller 100. The CPU 101 reads the programs stored in the ROM 102 or data stored in the RAM 103 or the EEPROM 104, and executes calculations in accordance with the programs.

The ASIC 106 is connected to the first CIS 85 and the second CIS 88 in the scanner 12 configured to read an image on the original 9. The ASIC 106 gives, to the first CIS 85, an electric signal for emitting light from a light source and a timing signal for outputting image data from a photoelectric conversion element based on a command from the CPU101. The first CIS 85 and the second CIS 88 receive these signals, irradiate the original 9 with light at a prescribed timing, and output the image data converted by the photoelectric conversion element.

The ASIC 106 is connected to a panel gate array (panel G/A) 111 configured to control the operation interface 19 configured to receive a user operation for inputting a desired command to the image recording apparatus 10. The panel gate array 111 detects a depression of the operation interface 19 and outputs a prescribed code signal. When a prescribed key code is received from the panel gate array 111, the CPU 101 executes control processing to be executed in accordance with a predetermined key processing table. The key processing table is a table in which key codes and control processing are associated with each other in the form of a table and is stored in, for example, the ROM 102.

An LCD controller 112 configured to control display of the LCD 22 is connected to the ASIC 106. The LCD controller 112 causes the LCD 22 to display information relating to the operation of the printer 11 or the scanner 12 on the screen based on a command from the CPU101.

The original sensor 91 configured to detect the leading end and the trailing end of the original 9 in the conveying path 122 (see FIG. 4) in the ADF 12c is connected to the ASIC 106.

The CR motor 108, the CR motor 115, the conveying motor 116, the feeding motor 113, and a cutting motor 114 are connected to the ASIC 135. A drive circuit configured to control each motor is incorporated in the ASIC 135. The CPU 101 outputs a drive signal for rotating each motor to the drive circuit corresponding to each motor. The drive circuit outputs a drive current corresponding to the drive signal acquired from the CPU 101 to the corresponding motor, whereby the corresponding motor rotates. That is, the controller 100 controls the feeding motor 113 to feed the recording sheet 8 to the conveying path 21, controls the conveying motor 116 to cause the conveyor 43 to convey the recording sheet 8, controls the CR motor 108 to move the CIS carriage 86, controls the CR motor 115 to move the carriage 35, and controls the cutting motor 114 to control the drive pulley 92.

Processes by Controller 100

The controller 100 is configured to execute a reading process, an image recording process, a cutting process, and a displaying process. In the present embodiment, the controller 100 executes the reading process and the image recording process after the displaying process, and then executes the cutting process.

The reading process is a process of reading an image on the original 9 with the scanner 12. The reading process includes a first reading process of reading an image on the first surface 117 of the original 9 and a second reading process of reading an image on the second surface 118 of the original 9. As shown in FIG. 4, when reading an image on the original 9, the user places a plurality of originals 9 on the ADF original tray 120 with the first surface 117 of the original 9 facing downward 54.

In response to receiving an instruction to start image reading, the controller 100 drives the LF conveying motor 110. When the LF conveying motor 110 is driven and the rollers 164, 166, 168, and 171 of the conveying mechanism 123 is driven, a lowermost original 9 among the plurality of originals 9 is conveyed from the ADF original tray 120.

The original sensor 91 detects the leading end of the original 9 conveyed from the ADF original tray 120. Based on the detection signal from the original sensor 91, the controller 100 conveys the original 9 by a prescribed distance and then starts a first reading process by the first CIS 85 and a second reading process by the second CIS 88.

The original 9 is conveyed with the first surface 117 facing downward 54 and the second surface 118 facing upward 53. The image on the second surface 118 of the original 9 is read by the second CIS 88 of the second image reader 87.

When the original 9 whose image has been read by the second image reader 87 is further guided by the positioning member 131 to reach the first image reader 84, the image on the first surface 117 is read by the first CIS 85. After the image has been read, the leading end portion of the original 9 is guided obliquely upward. The original 9 is conveyed in such a manner that the original 9 is largely warped from left to right along an outer peripheral surface of the third roller 171.

The original 9 is conveyed downstream in the conveying direction 124 while being nipped by the third rollers 171 and 172. The controller 100 conveys the original 9 whose image has been read by a prescribed distance and discharges the original 9 on the ADF discharge tray 121.

The image recording process is a process of recording an image of the original 9 read in the reading process on the recording sheet 8 with the recording engine 17. The cutting process is a process of cutting the recording sheet 8 subjected to the image recording process with the cutter 45 at a central position of the recording sheet 8 in the conveying direction 7. In the following description, a case in which an image on an A4 sized original 9 is reduced to A5 size and the reduced image is recorded on two recording sheets 8 will be described.

The controller 100 drives the feeding motor 113 to rotate the feed roller 32. As shown in FIG. 2, the uppermost recording sheet 8 of A4 size is fed from the sheet feed cassette 15 to the conveying path 21. The controller 100 drives the conveying motor 116 to rotate the Feed roller pair 25. As a result, the recording sheet 8 fed from the sheet feed cassette 15 to the conveying path 21 is conveyed below the recording head 37 by the Feed roller pair 25 and is supported from below by the platen 36.

While the conveyance of the recording sheet 8 is stopped, the controller 100 drives the CR motor 115 to move the carriage 35 in the lateral direction 55, 56. At this time, the controller 100 causes the recording head 37 to eject ink toward the recording sheet 8. An image of one pass is thereby recorded on the recording sheet 8. The conveyance and stop of the recording sheet 8 are repeated to record images of a prescribed number of passes, thereby the recording of an image on the recording sheet 8 is completed. In the present embodiment, two images for A5 sized recording sheet are recorded on one A4 sized recording sheet 8. For example, the controller 100 reduces an image of A4 size on the first surface 117 read in the first reading process and an image of A4 size on the second surface 118 read in the second reading process to A5 size, respectively, and records the reduced images on the recording sheet 8. When recording the images, the controller 100 drives the conveying motor 116 to rotate the first discharge roller pair 27. As a result, the recording sheet 8 that has passed over the platen 36 is conveyed below the cutter 45.

When the center of the recording sheet 8 in the conveying direction 7 is conveyed below the cutter 45, the controller 100 drives the cutting motor 114 to rotate the drive pulley 92. As a result, the blade carriage 82 moves rightward 56 from the stop position (the position of the cutter 45 shown in FIG. 3) along the guide rail 81. The A4 sized recording sheet 8 is sandwiched between the blade 83 and the fixed blade 95 at the center in the conveying direction 7 and is cut in the lateral direction 55, 56 to form two A5 sized recording sheets. As shown in FIG. 2, the two A5 sized recording sheets are discharged from the conveying path 21 to the sheet discharge tray 18 by the second discharge roller pair 28.

In the present embodiment, the displaying process is executed before the reading process, the image recording process, and the cutting process. In other words, the displaying process is a process for allowing the user to collectively select the reading process, the image recording process, and the cutting process. In the displaying process, the controller 100 displays various kinds of information concerning the image recording apparatus 10 or a figure or icon that can be selected through the operation interface 19 on the LCD 22.

Figure 6:
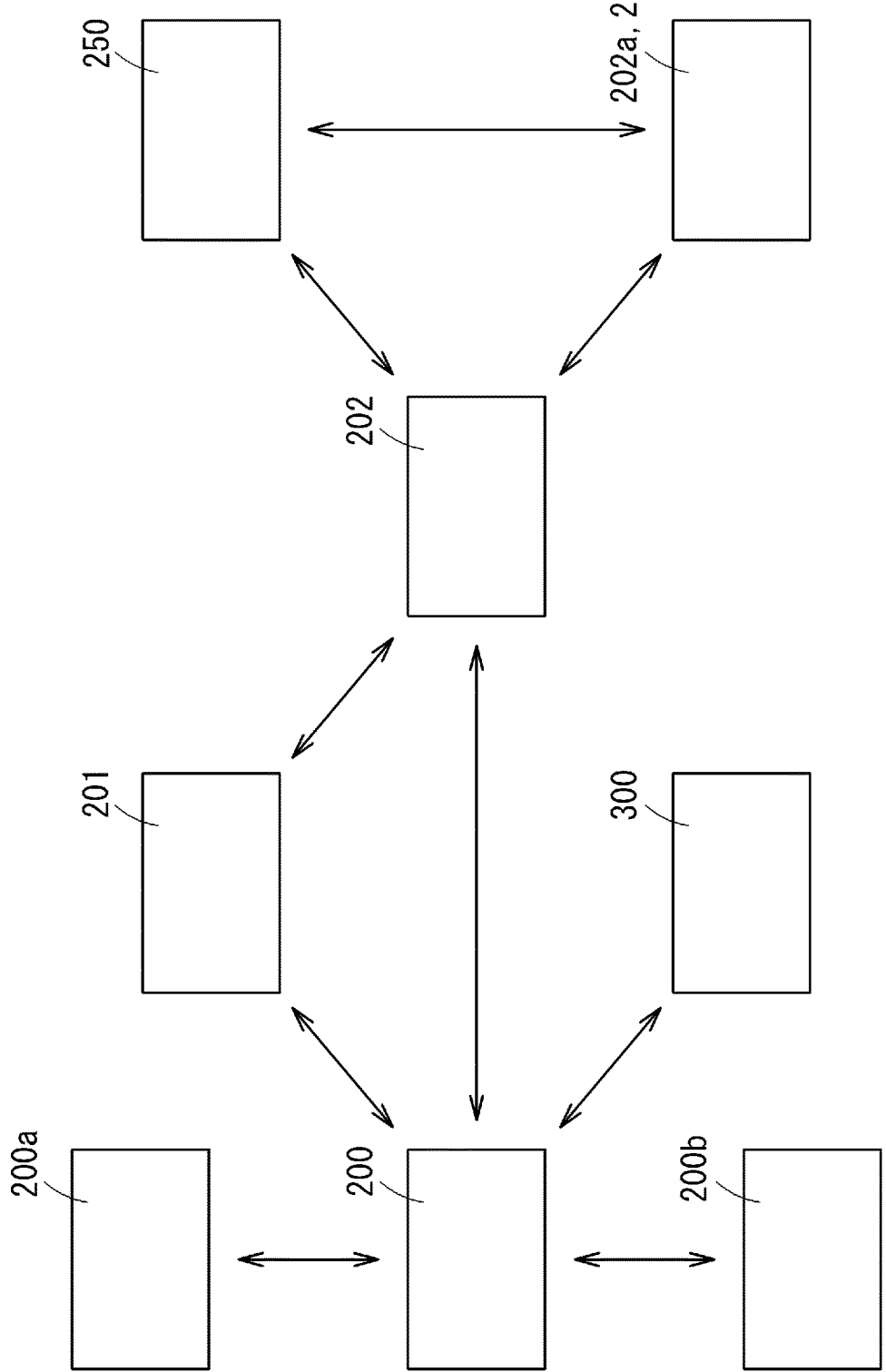
FIG. 6 is a diagram illustrating a screen displayed on an LCD.
Figure 7:
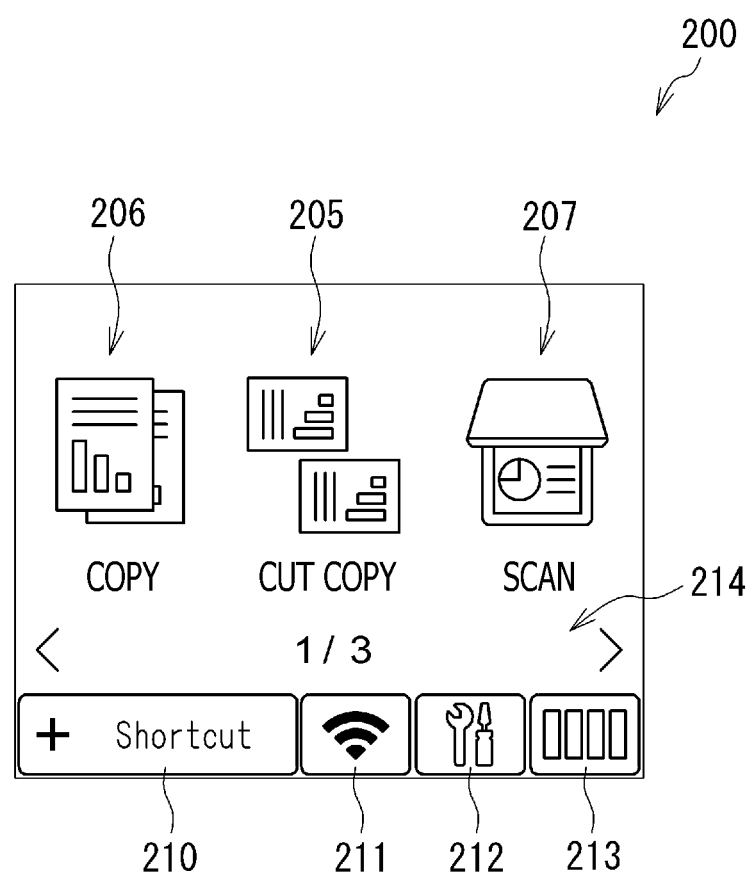
FIG. 7 is a diagram showing a function selection screen to be displayed on the LCD of the image recording apparatus.

As shown in FIGS. 6 and 7, in the display process, the controller 100 changes the screen in response to selection of an icon configured to receive a user operation for executing the reading process, the image recording process, the cutting process, or various settings.

The controller 100 displays a function selection screen 200 on the LCD 22 when the power of the image recording apparatus 10 is turned on. The controller 100 also displays the function selection screen 200 on the LCD 22 when the image recording apparatus 10 returns from a sleep state for power saving to a standby state. That is, the function selection screen 200 is both a home screen and a standby screen.

As shown in FIG. 6, when executing a function provided in the image recording apparatus 10 which is not displayed on the function selection screen 200, the controller 100 displays a sub-screen 200a or 200b which display other functions in accordance with an operation by the user. When the user depresses the clear button 19c in the state where the sub-screen 200a or 200b is displayed, the controller 100 displays the function selection screen 200. The detailed description of the sub-screens 200a and 200b is herein omitted.

When the user performs an operation to execute the reading process, the image recording process, and the cutting process in the state where the function selection screen 200 is displayed, that is, when the user operates the move button 19a to select a first icon 205 and depresses the select button 19b, the controller 100 displays a message screen 201 or a first screen 202. When the user depresses the clear button 19c in the state where the message screen 201 or the first screen 202 is displayed, the controller 100 displays the function selection screen 200. The message screen 201 is a screen for explaining that the cutting process will be executed in copying, and is a screen of which displaying can be omitted from the next time in accordance with the user's operation. Since the message screen 201 is an arbitrary screen, detailed description thereof is herein omitted.

When the user performs an operation to execute a reading process and an image recording process (hereinafter also referred to as a copying process) in the state where the function selection screen 200 is displayed, that is, when the user operates the move button 19a to select a second icon 206 and depresses the select button 19b, the controller 100 displays a copy setting screen 300 which is a setting screen for the reading process and the image recording process. When the user depresses the clear button 19c in the state where the copy setting screen 300 is displayed, the controller 100 displays the function selection screen 200. The copy setting screen 300 is a screen for setting the size of the recording sheet 8, image quality, enlargement or reduction and the like. Detailed description of the copy setting screen is herein omitted.

When the user performs an operation to set a size of the original 9 by selecting a later-described first size change icon 225 in the state where the first screen 202 is displayed, that is, when the user selects the first size change icon 225 by operating the move button 19a and depresses the select button 19b, the controller 100 displays a second screen 250 (see FIG. 9) for selecting the size of the original 9. When the user performs an operation to select the size in the state where the second screen 250 is displayed, the controller 100 displays either the first screen 202 in which the size of the original 9 is set to the selected size, or other first screen 202a, 202b, 202c, or 202d in which the setting of the size of the original 9 is different from that of the first screen 202. When the user depresses the clear button 19c in the state where the second screen 250 is displayed, the controller 100 displays the first screen 202 which was displayed before the selection of the size of the original 9.

Hereinafter, the function selection screen 200, the first screen 202, and the other first screens 202a, 202b, 202c, and 202d will be described.

As shown in FIG. 7, the function selection screen 200 includes the first icon 205, a second icon 206, and a third icon 207 arranged in the horizontal direction at the upper side. The function selection screen 200 includes a shortcut icon 210, a communication setting icon 211, an environment setting icon 212, and an ink remaining amount icon 213 at the lower side. The function selection screen 200 includes a switching icon 214 at the center in the vertical direction.

The first icon 205, the second icon 206, and the third icon 207 can be selected through the operation of the operation interface 19 by the user. Each of the first icon 205, the second icon 206, and the third icon 207 is an icon in which a figure and a character are shown. Although not shown in the drawings, for example, the first icon 205, the second icon 206, or the third icon 207, which is being selected, is highlighted by reversing brightness and darkness. By operating the move button 19a, the user can change the icon to be highlighted in any direction on the function selection screen 200.

The first icon 205 receives a command to execute the reading process, the image recording process, and the cutting process in one operation. The first icon 205 is an icon in which a character string "CUT COPY" and a figure including two horizontally oriented rectangles representing two vertically separated recorded sheets are displayed such that the figure is on the top and the character string is on the bottom. The first icon 205 is disposed at the center of the function selection screen 200 in the horizontal direction.

The second icon 206 receives a command to execute the copying process, that is, a command to execute the reading process and the image recording process in one operation. The second icon 206 is an icon in which a character string "COPY" and a figure including two vertically oriented rectangles representing two vertically separated recording sheets 8 are displayed such that the figure is on the top and the character string is on the bottom. The second icon 206 is disposed on the left side of the function selection screen 200 in the horizontal direction.

The third icon 207 receives a command to execute the reading process. The third icon 207 is an icon in which the character string "SCAN" and a figure representing a state in which one original 9 before reading, represented by one horizontally oriented rectangle, is set in a scanner with a cover opened are displayed such that the figure is on the top and the character string is on the bottom. The third icon 207 is disposed on the right side of the function selection screen 200 in the horizontal direction.

The shortcut icon 210, the communication setting icon 211, the environment setting icon 212, and the ink remaining amount icon 213 are arranged in this order from the left at the lower side of the function selection screen 200. The shortcut icon 210 is an icon configured to receive a user operation for displaying commands frequently used by the user, and is represented by a character string "SHORTCUT." The communication setting icon 211 is an icon configured to receive a user operation for receiving settings for connecting the image recording apparatus 10 to external information devices, and is represented by a mark imitating radio wave. The environment setting icon 212 is an icon configured to receive a user operation for setting an operating environment of the image recording apparatus 10, and is represented by an icon imitating tools. The ink remaining amount icon 213 is an icon displaying the current remaining amount of ink of each color, and is represented by gauges of respective colors.

When the user selects one of icons indicated by the left and right arrows in the switching icon 214 by operating the move button 19*a* and depressing the select button 19*b*, the controller 100 switches the display to the sub-screen 200*a* or 200*b* in which other functions not displayed on the function selection screen 200 can be selected.

Figure 8:
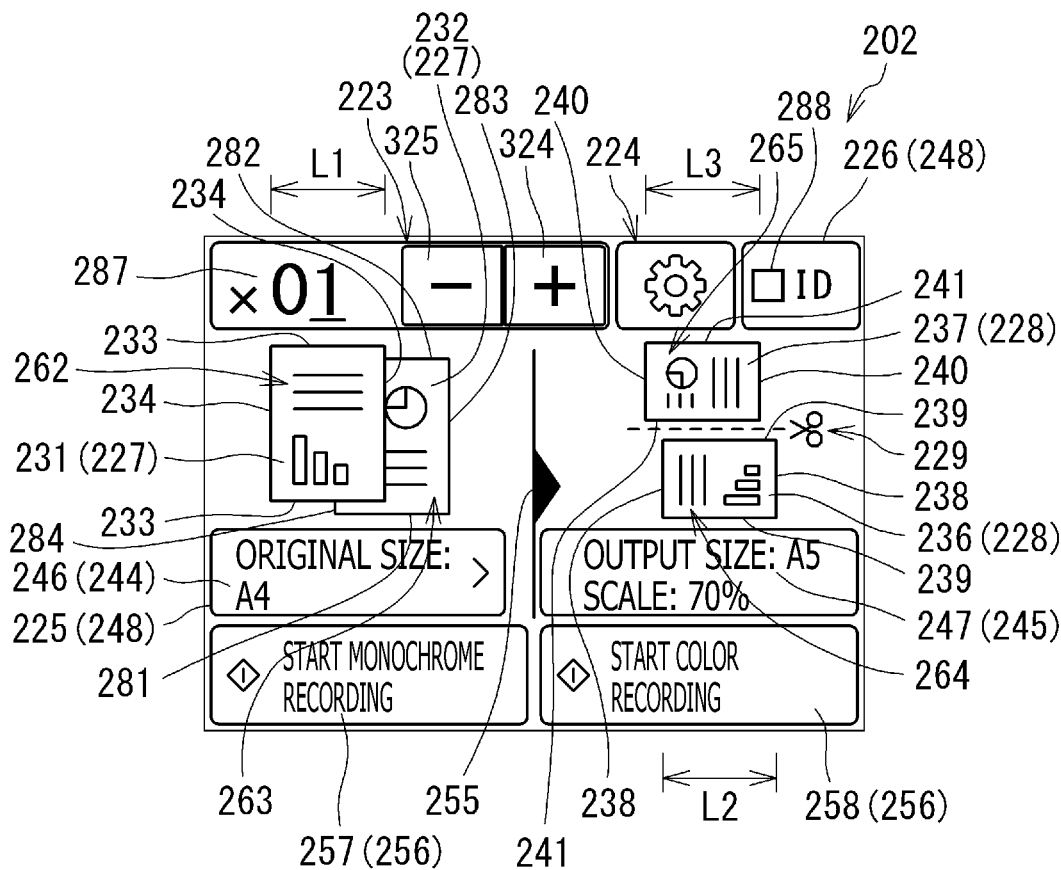
FIG. 8 is a diagram showing a first screen to be displayed on the LCD of the image recording apparatus.

The first screen 202 is a screen configured to display, on the LCD 22, an image on the original 9 to be read and an imaginary preview of images recorded on the cut recording sheets 8 before executing the reading process, the image recording process, and the cutting process. As shown in FIG. 8, the first screen 202 includes a plurality of icons. The first screen 202 is generally divided into four stages, namely, the uppermost stage, the upper stage, the lower stage, and the lowermost stage, from the top to the bottom. The first screen 202 includes a fifth receiving section 223, a setting icon 224, and a second size change icon 226 at the uppermost stage, and includes a first icon 227, a second icon 228, and a third icon 229 at the upper stage.

The fifth receiving section 223, the setting icon 224, and the second size change icon 226 are arranged side by side in the horizontal direction in the uppermost stage of the first screen 202.

The fifth receiving section 223 includes a counter 287, a plus button 324, and a minus button 325. The counter 287 indicates how many images of the original 9 to be read to record on the recording sheet 8. That is, the number displayed in the counter 287 indicates the number of copies to be recorded. The number of copies to be recorded displayed in the counter 287 increases or decreases as the plus button 324 or the minus button 325 are operated by the user.

The setting icon 224 receives changes to various settings. The various settings are not directly related to the present invention and thus the description thereof is herein omitted. The second size change icon 226 will be described later.

The first icon 227, the second icon 228, and the third icon 229 are arranged in the upper stage of the first screen 202. The first icon 227 is an icon displayed as a figure representing a state in which two originals 9, represented by two vertically oriented rectangles, are partially overlapped. The first icon 227 is positioned on the left with respect to the center in the horizontal direction of the first screen 202. The first icon 227 is an icon in which the original 9 to be read is represented by a first rectangle 231 and another rectangle 232 on the first screen 202.

The first rectangle 231 represents the first page of the image read from the original 9 and represents a frame of the image. In the case of double-sided reading, the first rectangle 231 represents an image read from the first surface 117 of the original 9. The first rectangle 231 has two short sides 233 and two long sides 234. The two short sides 233 of the first rectangle 231 are arranged in the vertical direction of the first screen 202. The two long sides 234 of the first rectangle 231 are arranged in the horizontal direction of the first screen 202. A third image 262 representing the first page of the image read from the original 9 is displayed inside the first rectangle 231. The third image 262 includes three lines extending laterally in the upper part, and a vertically oriented bar graph in the lower part. The third image 262 is asymmetric in the vertical direction and in the horizontal direction so that the user can easily recognize an orientation of the image.

The other rectangle 232 represents the second page of the image read from the original 9, and represents a frame of the image. In the case of double-sided reading, the other rectangle 232 represents an image read from the second surface 118 of the original 9. As with the first rectangle 231, the other rectangle 232 is displayed to be vertically oriented with its short sides arranged in the vertical direction and its long sides arranged in the horizontal direction. More specifically, the other rectangle 232 has a short side 281, a portion of a short side 282, a long side 283, and a portion of a long side 284. The short side 281 and a portion of the short side 282 are arranged in the vertical direction, and the long side 283 and a portion of the long side 284 are arranged in the horizontal direction. A fourth image 263 representing the second page of the image read from the original 9 is displayed inside the other rectangle 232. The fourth image 263 includes, in a portion not overlapping with the first rectangle 231, a circle graph (straight lines extending in the directions of 12 o' clock and 9 o' clock from the center are shown) shown in the upper part and three lateral lines shown in the lower part. The fourth image is asymmetric in the vertical direction and in the horizontal direction so that the user can easily recognize an orientation of the image.

The third image 262 of the original 9 shown in the first rectangle 231 and the fourth image 263 of the original 9 shown in the other rectangle 232 only need to be schematic figures that can be distinguished from each other and thus do not necessarily need to coincide with characters and/or figures actually recorded on the original 9. The third image 262 and the fourth image 263 are preferably different images. This makes it easy for the user to recognize that the third image 262 and the fourth image 263 are the first page and the second page of the original 9 to be read. The first rectangle 231 and the other rectangle 232 at least partially overlap with each other. This makes it easy for the user to recognize that the first rectangle 231 and the other rectangle 232 are the original 9 to be read. The first rectangle 231 and the other rectangle 232 do not necessarily need to be overlapped with each other.

The second icon 228 is positioned on the right of the first icon 227. As with the first icon 205, the second icon 228 is an icon displayed as a figure including two horizontally oriented rectangles representing two vertically separated recorded sheets. The second icon 228 is obtained by displaying the cut recording sheets 8 as a second rectangle 236 and a third rectangle 237 in the first screen 202. The second icon 228 is positioned on the right with respect to the center of the first screen 202 in the horizontal direction.

The second rectangle 236 represents one of the two recording sheets 8 formed by the cutting process, and represent a sheet to be discharged first among the two recording sheets 8 formed by cutting. The second rectangle 236 is positioned below the third rectangle 237. The second rectangle 236 represents the recording sheet 8 on which the first page of the image read from the original 9 is recorded. A fifth image 264, which is the same as the third image 262 shown in the first rectangle 231, is displayed inside the second rectangle 236. As a result, the user can understand that the first rectangle 231 representing the first page of the original 9 corresponds to the second rectangle 236 representing one of the recording sheets 8 after the cutting process.

In the present embodiment, since the size of the original 9 and the size of the recording sheet 8 before the cutting process are A4 size, and the sizes of the recording sheets 8 after the cutting process are A5 size, the fifth image 264 is smaller than the third image 262. That is, the fifth image 264 is smaller than the third image 262 in proportion to the difference in size between the second rectangle 236 and the first rectangle 231. More specifically, the fifth image 264 is an image showing the third image 262 at a magnification obtained by changing the size from A4 size to A5 size (i.e., 70%). As with the third image 262, the fifth image 264 is represented by three lateral lines and a vertically oriented bar graph. An orientation of the fifth image 264 is obtained by rotating the third image 262 90 degrees counterclockwise. In other words, the upper side of the third image 262 corresponds to the left side of the fifth image 264. As a result, the user can easily understand that the image recording process is executed on the recording sheets 8 after the cutting process while the first page of the original 9 is reduced and rotated 90 degrees counterclockwise.

The second rectangle 236 has two short sides 238 and two long sides 239. The two short sides 238 of the second rectangle 236 are arranged in the horizontal direction of the first screen 202. The two long sides 239 of the second rectangle 236 are arranged in the vertical direction of the first screen 202. As shown in FIG. 8, a length L2 of the long side 239 of the second rectangle 236 is the same as a length L1 of the short side 233 of the first rectangle 231 (L1=L2). The size of the original 9 is A4 size, and the recording sheet 8 before the cutting process is A4 size and is cut into A5 size.

The third rectangle 237 represents the other of the two recording sheets 8 formed by the cutting process, and represents a sheet to be discharged second among the two recording sheets 8 after the cutting process. The third rectangle 237 is positioned above the second rectangle 236. The third rectangle 237 represents the recording sheet 8 on which the second page of the image read from the original 9 is recorded. A sixth image 265, which is an image including the same image as the fourth image 263 shown in the other rectangle 232, is shown inside the third rectangle 237. As a result, the user can understand that the other rectangle 232 representing the second page of the original 9 corresponds to the third rectangle 237 representing the other of the recording sheets 8 after the cutting process.

As in the relationship between the fifth image 264 and the third image 262, the sixth image is smaller than the fourth image 263. That is, the sixth image 265 is smaller than the fourth image 263 in proportion to the difference in size between the third rectangle 237 and the other rectangle 232. More specifically, the sixth image 265 is an image showing the fourth image 263 at a magnification obtained by changing the size from A4 size to A5 size (i.e., 70%). The sixth image 265 is shown by adding, to the image including the circle graph and the three lateral lines similar to the fourth image 263, three lateral lines adjacent to the circle graph. An orientation of the sixth image 265 is obtained by rotating the fourth image 263 90 degrees counterclockwise. That is, the upper side of the fourth image 263 corresponds to the left side of the sixth image 265. As a result, the user can easily understand that the image recording process is executed on the recording sheet 8 after the cutting process while the second page of the original 9 is reduced and rotated 90 degrees counterclockwise.

The third rectangle 237 has two short sides 240 and two long sides 241. The two short sides 240 of the third rectangle 237 are arranged in the horizontal direction of the first screen 202. The two long sides 241 of the third rectangle 237 are arranged in the vertical direction of the first screen 202. The third rectangle 237 is displayed in a state in which the horizontal direction is vertical.

The third rectangle 237 is disposed so as to be separated from the second rectangle 236 in a direction in which the short sides 238 of the second rectangle 236 extend (i.e., in the vertical direction). The short sides 240 of the third rectangle 237 are parallel to the long sides 234 of the first rectangle 231 and parallel to the short sides 238 of the second rectangle 236. The long sides 241 of the third rectangle 237 are parallel to the short sides 233 of the first rectangle 231 and parallel to the long sides 239 of the second rectangle 236. The third rectangle 237 is disposed so as to be offset from the second rectangle 236 in a direction in which the long sides 239 of the second rectangle 236 extend (i.e., in the horizontal direction). A length L3 of the long sides 241 of the third rectangle 237 is the same as the length L1 of the short sides 233 of the first rectangle 231 and the length L2 of the long sides 239 of the second rectangle 236 (L1=L2=L3). The size of the original 9 is A4 size, and the recording sheet 8 before the cutting process is A4 size and is cut into A5 size. It should be noted that the size of the original 9 and the size of the recording sheet 8 before the cutting process do not necessarily need to be the same, and the lengths L1, L2, and L3 do not necessarily need to be the same.

The fifth image 264 and the sixth image 265 do not necessarily need to coincide with characters or figures actually recorded on the original 9 as long as they are mutually distinguishable images. It is preferable that the third image 262 and the fifth image 264 are the same, and it is preferable that the fourth image 263 and a portion of the sixth image 265 are the same.

In the present embodiment, in the second rectangle 236, the three lateral lines and the vertically oriented bar graph shown in the first rectangle 231 are shown rotated 90 degrees counterclockwise. As a result, the user can understand that the first page of the image read from the original 9 will be recorded on one of the cut recording sheets 8 while being reduced and rotated 90 degrees counterclockwise. In the third rectangle 237, the circle graph and the three lateral lines shown in the other rectangle 232 are shown rotated 90 degrees counterclockwise. As a result, the user can understand that the second page of the image read from the original 9 will be recorded on the other of the cut recording sheet 8 while being reduced and rotated 90 degrees counterclockwise.

The third icon 229 imitates the shape of a pair of scissors. The third icon 229 is positioned between the second rectangle 236 and the third rectangle 237 of the second icon 228. More specifically, the third icon 229 is positioned on the right of a broken line disposed between the second rectangle 236 and the third rectangle 237.

The first screen 202 includes a first size information display 244 and a second size information display 245. The first size information display 244 and the second size information display 245 are arranged side by side in the horizontal direction in the lower stage of the first screen 202.

The first size information display 244 indicates a first size 246, which is the size of the original 9. Specifically, a character string "ORIGINAL SIZE" and a character string indicating standard sizes, such as A4 and A5, are arranged in the vertical direction. In the present embodiment, since the character string "A4" is shown, it can be understood that the A4 size is set as the first size 246. The first size information display 244 is positioned on the left side of the first screen 202 and is arranged below the first icon 227. As a result, the user can understand that the size of the first rectangle 231 indicated by the first icon 227 is the first size 246 indicated in the first size information display 244. A ratio of the long side to the short side of the first size 246 of the original 9 indicated in the first size information display 244 is the same as the ratio of the long side 234 to the short side 233 of the first rectangle 231.

The second size information display 245 indicates a second size 247, which is the size of the cut recording sheet 8. Specifically, a character string "OUTPUT SIZE:" and a character string indicating standard sizes, such as A4 and A5, are displayed separately in the horizontal direction, and a character string "SCALE:" and a percentage indicating the degree of scale are displayed separately in the horizontal direction. In the present embodiment, since character strings "A5" and "70%" are displayed, it can be understood that the second size 247 is set to the A5 size obtained by reducing the size of the A4-sized original by 70%. The second size information display 245 is positioned on the right side of the first screen 202 and is arranged below the second icon 228. As a result, the user can understand that the sizes of the second rectangle 236 and the third rectangle 237 shown in the second icon 228 are the size indicated in the second size information display 245. The first size information display 244 and the second size information display 245 are not limited to the above-described displays as long as the sizes of the original 9 and the cut recording sheet 8 can be understood.

The first screen 202 further includes a size change receiving section 248 configured to receive a user operation for changing the first size 246.

The size change receiving section 248 includes a first size change icon 225 and a second size change icon 226. As shown in FIG. 8, the first size change icon 225 is disposed at the position of the first size information display 244. That is, the first size information display 244 functions as an icon selectable as the size change receiving section 248. The second size change icon 226 is disposed on the right side in the uppermost stage of the first screen 202.

Figure 9:
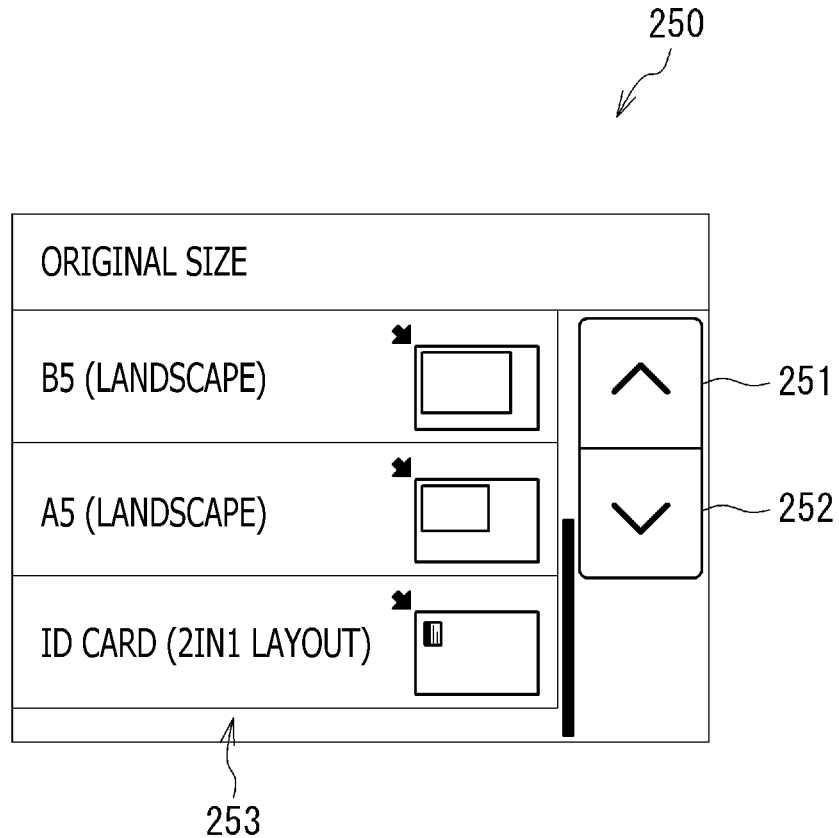
FIG. 9 is a diagram showing a second screen to be displayed on the LCD of the image recording apparatus.

The first size change icon 225 receives an operation from a user who wants to display the second screen 250 configured to receive a user operation for selecting the size of the original 9 (see FIG. 9). The user can perform an operation to change the first size 246 on the second screen 250 by selecting the size change receiving section 248 in which the first size 246 is displayed with the move button 19a of the operation interface 19 and depressing the select button 19b. In response to this operation, the controller 100 displays the first screen 202 shown in FIG. 10 or the other first screens 202a, 202b, 202c, and 202d.

The second screen 250 is a screen on which the user can select the size of the original 9 to be read. The second screen 250 includes a table 253 indicating the size of the original 9 selectable by the user, an up button icon 251 configured to receive a user operation for moving the table 253 upward, and a down button icon 252 configured to receive a user operation for moving the table 253 downward. The table 253 displays sizes of the original 9 such as B5, A5, ID card, A4, LTR (not shown), and the like in a selectable manner.

The table 253 also includes automatic detection (not shown) that can automatically detect the size of the original 9 to be read by the scanner 12. The table 253 displays arrows indicating directions in which the original 9 is to be aligned when it is placed on the platen glass 128. Only three sizes among the sizes included in the table 253 are displayed on the second screen 250. When selecting a size that is not displayed, the user selects the up button icon 251 or the down button icon 252 and depresses the select button 19b to display, on the second screen 250, a size that is positioned above or below the displayed sizes in the table 253.

As shown in FIG. 10, when the size of the original 9 is selected on the second screen 250, the first size information display 244 displays the size of the original 9 as the first size 246, and the second size information display 245 displays the size of the recording sheet 8 after the cutting process as the second size 247, and a magnification ratio of the size of the recording sheet 8 after the cutting process with respect to the original 9.

Figure 10A:
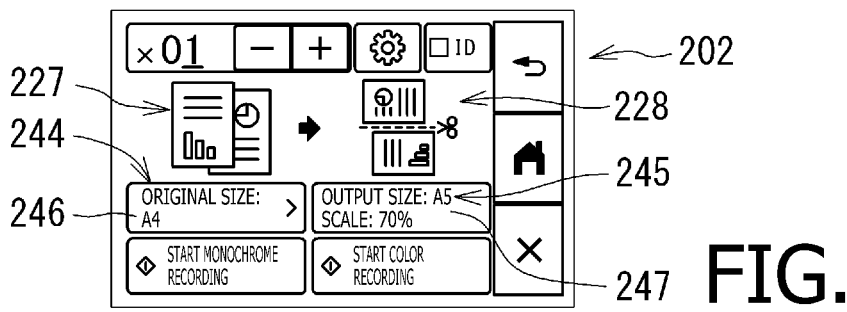
FIG. 10A is a diagram showing a first screen to be displayed on the LCD of the image recording apparatus.
Figure 10B:
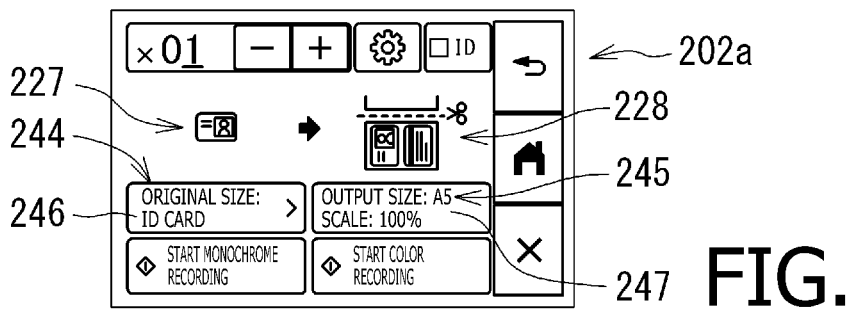
FIG. 10B is a diagram showing another first screen to be displayed on the LCD of the image recording apparatus.

When the A4 size is selected as the first size 246 of the original 9 in the second screen 250, as shown in FIG. 10A, the controller 100 displays the first screen 202 which is the same as the screen before the selection again. Since the second size 247 displayed in the second size information display 245 is the same as the size displayed in the screen before the selection, description thereof is herein omitted. When the ID card (2-in-1 layout) is selected as the first size 246 of the original 9 in the second screen 250, the controller 100 displays the other first screen 202a shown in FIG. 10B. In this case, the second size 247 is A5 and the scale is 100%. Therefore, in the second size information display 245, the character string "A5" is displayed as the output size and the character string "100%" is displayed as the scale. Details of the other first screen 202a will be described later.

Figure 10C:
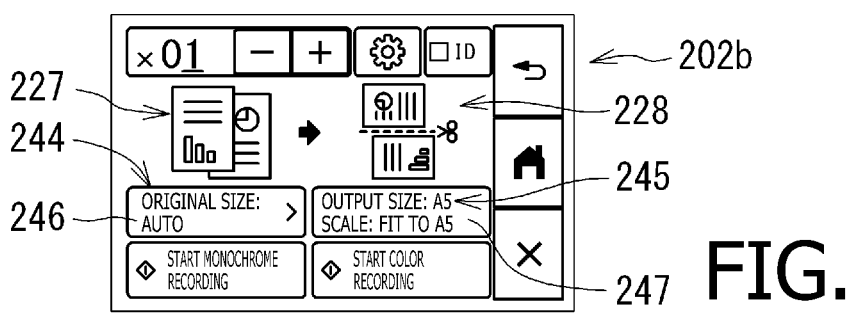
FIG. 10C is a diagram showing another first screen to be displayed on the LCD of the image recording apparatus.
Figure 10D:
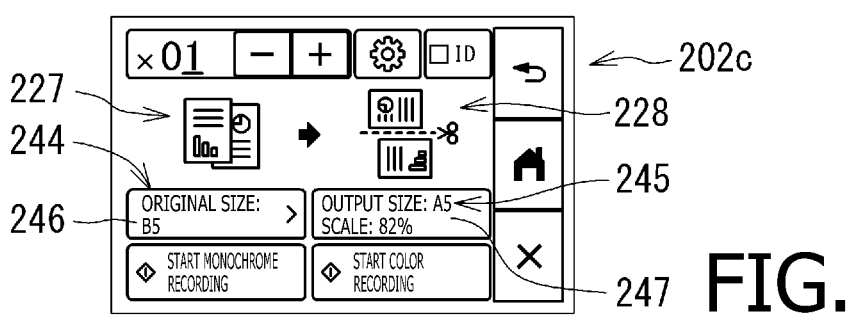
FIG. 10D is a diagram showing another first screen to be displayed on the LCD of the image recording apparatus.
Figure 10E:
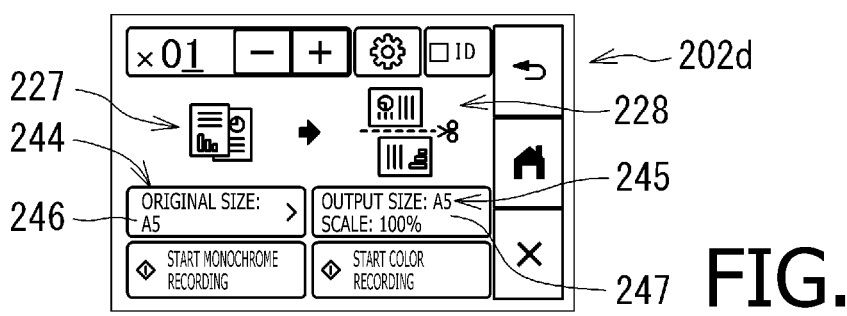
FIG. 10E is a diagram showing another first screen to be displayed on the LCD of the image recording apparatus.

Similarly, when the automatic detection is selected as the first size 246, the controller 100 displays the other first screen 202b shown in FIG. 10C. In this case, the second size 247 is A5 and is displayed as the character string "A5" in the second size information display 245. The scale is automatically processed and is displayed as a character string "FIT TO A5" in the second size information display 245. When the B5 size is selected as the first size 246, the controller 100 displays the other first screen 202c shown in FIG. 10D. In this case, the second size 247 is A5 and the scale is 82%. Therefore, in the second size information display 245, the character string "A5" is displayed as the output size and the character string "82%" is displayed as the scale. When the A5 size is selected as the first size 246, the controller 100 displays the other first screen 202d shown in FIG. 10E. In this case, the second size 247 is A5 and the scale is 100% Therefore, in the second size information display 245, the character string "A5" is displayed as the output size and the character string "100%" is displayed as the scale.

As described above, the size of the original 9 represented by the first icon 227 is displayed in the first size information display 244, and the size and magnification of the cut recording sheet 8 represented by the second icon 228 is displayed in the second size information display 245. The first icon 227 and the second icon 228 are displayed in accordance with the first size 246, the second size 247, and the magnification. Therefore, the size of the original 9 and the size of the cut recording sheet 8 are visually recognizable by the user, and the user can easily understand that the image on the read original 9 will be recorded on the cut recording sheet 8.

When setting the ID card as the original 9, apart from selecting the ID card from the table 253 of the second screen 250, the ID card can also be selected in the second size change icon 226 of the first screen 202 shown in FIG. 8. The second size change icon 226 of the first screen 202 receives a command to set the size of the original 9 to the size of the ID card. The second size change icon 226 includes a check box 288 labeled which the character string "ID." When the second size change icon 226 is operated, a check mark is displayed in the check box 288. In this case, the controller 100 sets the size of the original 9 to the size of the ID card without moving to the second screen 250. Examples of the size of the ID card include various licenses, insurers' certificates, and business cards.

Figure 11:
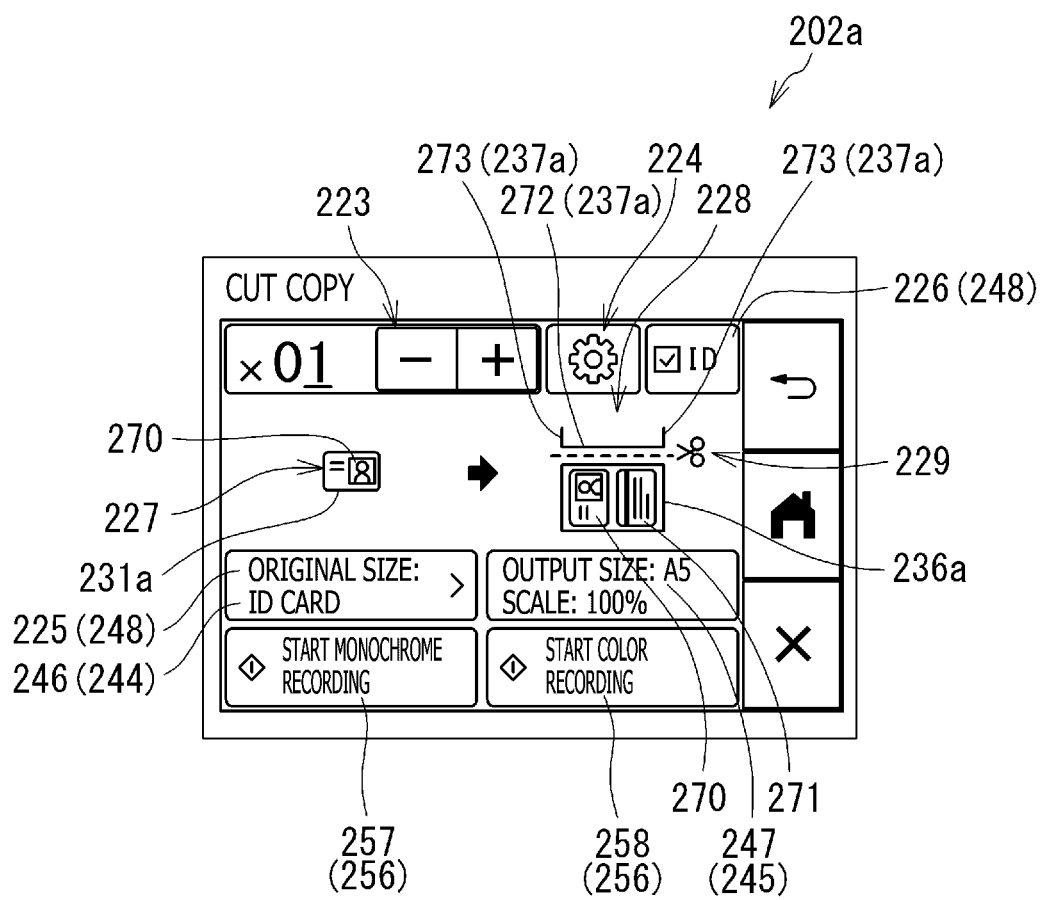
FIG. 11 shows the first screen shown in FIG. 10B.

When the ID card is set as the original 9, as shown in FIG. 11, the controller 100 displays the first size 246, the first icon 227, and the second icon 228 of the ID card being the original 9 on the other first screen 202a.

In the ID card reading process, after the first CIS 85 reads the first surface 117 of the ID card placed on the platen glass 128 in the first reading process, the controller 100 reads the second surface 118 of the ID card placed face down in the second reading process. The controller 100 records the image on the first surface 117 read in the first reading process and the image on the second surface 118 read in the second reading process on the recording sheet 8 before the cutting process. In this case, the controller 100 executes the image recording so that all the images on the first surface 117 and the second surface 118 fit in one of the recording sheets 8 cut to the A5 size.

The first icon 227 is obtained by displaying the original 9 to be recorded as a first rectangle 231a on the first screen 202a. As shown in FIG. 11, when the first size 246 of the original 9 is set to the size of the ID card, the first rectangle 231a is displayed in the form of a horizontally oriented rectangle with rounded corners. A first image 270 is displayed inside the first rectangle 231a as an image representing the image on the first surface 117 of the ID card. The first image 270 does not necessarily need to be the same image as an image on the first surface 117 of the actual ID card, as long as the user can recognize that a face photo and information for identifying a person are displayed. In the present embodiment, two lateral lines are displayed in the left half, and a square frame and an outer shape of an upper body of a person within the square frame are displayed in the right half. The first image 270 is asymmetric in the vertical direction and in the horizontal direction.

The second icon 228 represents each of the cut recording sheets 8 with a second rectangle 236a and a third rectangle 237a in the first screen 202a.

The second rectangle 236a is horizontally oriented. Inside the second rectangle 236a, the first image 270 is displayed in the left half, and the second image 271 is displayed in the right half as an image representing an image on the second surface 118 of the ID card. The second image 271 needs not be the same as the image on the second surface 118 of the actual ID card as long as the user can recognize that the second image 271 represents personal information different from that in the first image 270. In the present embodiment, a plurality of straight lines extending in the vertical direction and having different thicknesses are arranged parallel to each other in the horizontal direction.

The third rectangle 237a is displayed with one long side 272 and portions 273 of the two short sides. That is, in the second icon 228, the second rectangle 236a is displayed as the entire rectangle, and the third rectangle 237a is displayed as a portion of the rectangle. The third icon 229 is displayed between the second rectangle 236a and the third rectangle 237a.

As shown in FIG. 8, the first screen 202 further includes a fourth icon 255. The fourth icon 255 is an arrow pointing from the first icon 227 to the second icon 228. The fourth icon 255 is disposed at the center of the first screen 202 in the horizontal direction. The fourth icon 255 is extends from the upper stage to the lower stage of the first screen 202.

The first screen 202 includes a recording start receiving section 256 configured to receive a user operation for starting the reading process, the image recording process, and the cutting process. The recording start receiving section 256 includes a first recording start icon 257 and a second recording start icon 258. The first recording start icon 257 and the second recording start icon 258 are displayed at the lowermost stage of the first screen 202.

The first recording start icon 257 is an icon in which a rhombic figure and a character string "START MONOCHROME RECORDING" is displayed, and receives a command to execute the image recording process with a monochrome image. When the user selects the first recording start icon 257 and depresses the select button 19b, the reading process, the image recording process, and the cutting process are started, and the image is recorded in monochrome.

The second recording start icon 258 is an icon in which a rhombic figure and a character string "START COLOR RECORDING" is displayed, and receives a command to execute the image recording process with a color image. When the user selects the second recording start icon 258 and depresses the select button 19b, the reading process, the image recording process, and the cutting process are started, and the image is recorded in color.

Effects of Embodiment

According to the image recording apparatus 10, the user can confirm an imaginary preview of the image of the original 9 read by the scanner 12 and the image of the cut recording sheet 8 with the first icon 227 and the second icon 228 on the LCD 22 before executing the reading process, the image recording process, and the cutting process.

In the first screen 202, the user can easily recognize from the fourth icon 255 indicated by the arrow pointing from the first icon 227 to the second icon 228 that the first icon 227 represents the state before the cutting process and the second icon 228 represents the state after the cutting process.

The sizes of the second rectangle 236 and the third rectangle 237 are smaller than the size of the first rectangle 231. Therefore, the user can easily recognize that the second rectangle 236 and the third rectangle 237 represent the recording sheet 8 in the cut state.

Since the lengths of the long sides 239 of the second rectangle 236 and the long sides 241 of the third rectangle 237 are the same as the length of the short side 233 of the first rectangle 231, the user can easily understand the size relationship between the second and third rectangles 236 and 237 and the first rectangle 231.

Since the second rectangle 236 and the third rectangle 237 of the second icon 228 are offset in the direction in which the long sides 239 of the second rectangle 236 extend, the user can easily recognize that the second rectangle 236 and the third rectangle 237 are separated from each other. Therefore, the user can easily recognize that the second icon 228 indicates the recording sheet 8 in the cut state.

The third icon 229 is positioned between the second rectangle 236 and the third rectangle 237, and the third icon 229 imitates at least a portion of a pair of scissors. Therefore, the user can easily recognize that the second rectangle 236 and the third rectangle 237 represent the recording sheet 8 being cut, and the user can easily recognize from the third icon 229 that the function of cutting the recording sheet 8 will be executed.

The user can change the first size information display 244 by operating the size change receiving section 248 on the first screen 202 in which the first size information display 244 is positioned. Therefore, the user can perform an operation to change the first size information display 244 intuitively.

Since the ratio of the short side to the long side of the first size 246 is the same as the ratio of the short side 233 to the long side 234 of the first rectangle 231, the user can easily recognize that the first rectangle 231 imitates the original 9.

Since the size of the original 9 and the size of the recording sheet 8 after the cutting process can be simultaneously viewed on the first screen 202, the user can easily recognize the difference in size between the original 9 and the recording sheet 8 after the cutting process.

Since the first screen 202 includes the second size change icon 226 configured to receive a user operation for setting the size of the original 9 to the size of a card in addition to the first size change icon 225, the user can easily switch the setting of the size of the original 9 to the size of the card on the first screen 202 without displaying the second screen 250.

The first recording start icon 257 and a second recording start icon 258 are displayed on the first screen 202 as the recording start receiving section 256. Therefore, the user can select the start of color or monochrome image recording while confirming the preview of the image recording after the recording sheet 8 is cut, without performing an operation of switching the screen.

Even when the original 9 has images on the first surface 117 and the second surface 118, the images on the first surface 117 and the second surface 118 of the original 9 can be collectively recorded on one of the cut recording sheets 8. In this case, the first image 270 is displayed in the first rectangle 231a, and the first image 270 and the second image 271 are displayed in the second rectangle 236a. Therefore, the user can confirm, before the cutting process, the preview of the recording sheet 8 having been cut and on which the images on the first surface 117 and the second surface 118 of the original 9 have been recorded.

First Modification

Figure 12:
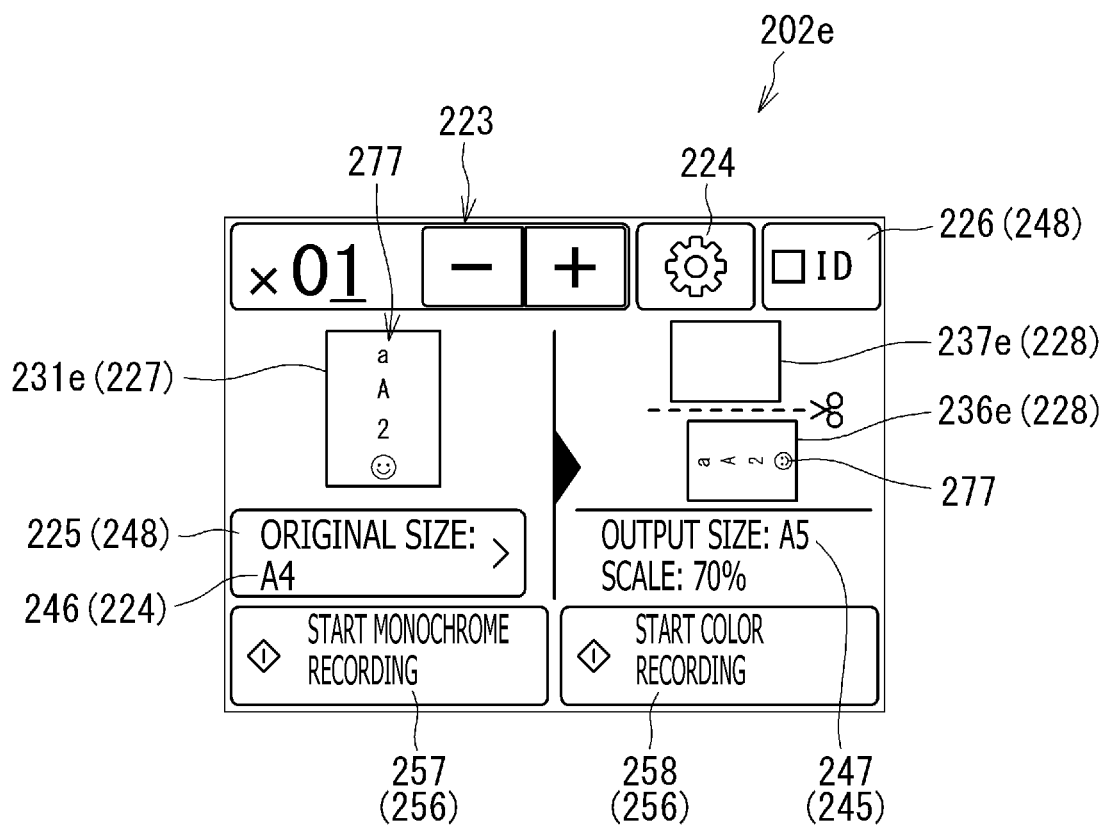
FIG. 12 is a diagram showing another first screen in an image recording apparatus according to a first modification.

As shown in FIG. 12, a first screen 202e of the image recording apparatus 10 according to the first modification includes a first icon 227 displayed as a vertically oriented first rectangle 231e and a second icon 228 displayed as two rectangles, namely, a horizontally oriented second rectangle 236e and a horizontally oriented third rectangle 237e. Inside the first rectangle 231e, a first display 277 including characters, a number, and a symbol or figure of which orientation can be recognized are displayed. Inside the second rectangle 236e, the first display 277 is displayed after being reduced and rotated 90 degrees counterclockwise. In the first modification, the characters, the number, and the symbol or figure of the first display 277 in the first rectangle 231e are displayed with their upper sides oriented upward, and the characters, the number, and the symbol or figure of the first display 277 in the second rectangle 236e are displayed with their left sides oriented upward. It should be noted that no image is displayed in the third rectangle 237e.

Effects of First Modification

By displaying the first display 277 inside the first rectangle 231e of the first icon 227 and inside the second rectangle 236e of the second icon 228 Before executing the image recording process and the cutting process, the user can recognize that the image on the original 9 will be recorded so as to fit in one of the recording sheets 8 after the cutting process. Since the orientation of the first display 277 can be recognized, the user can recognize in which orientation the image on the original 9 will be recorded on one of the recording sheets 8 after the cutting process.

In the first modification, the case where the first display 277 is displayed inside the second rectangle 236e has been described by way of example, but the first display 277 may be displayed inside the third rectangle 237e.

Second Modification

Figure 13:
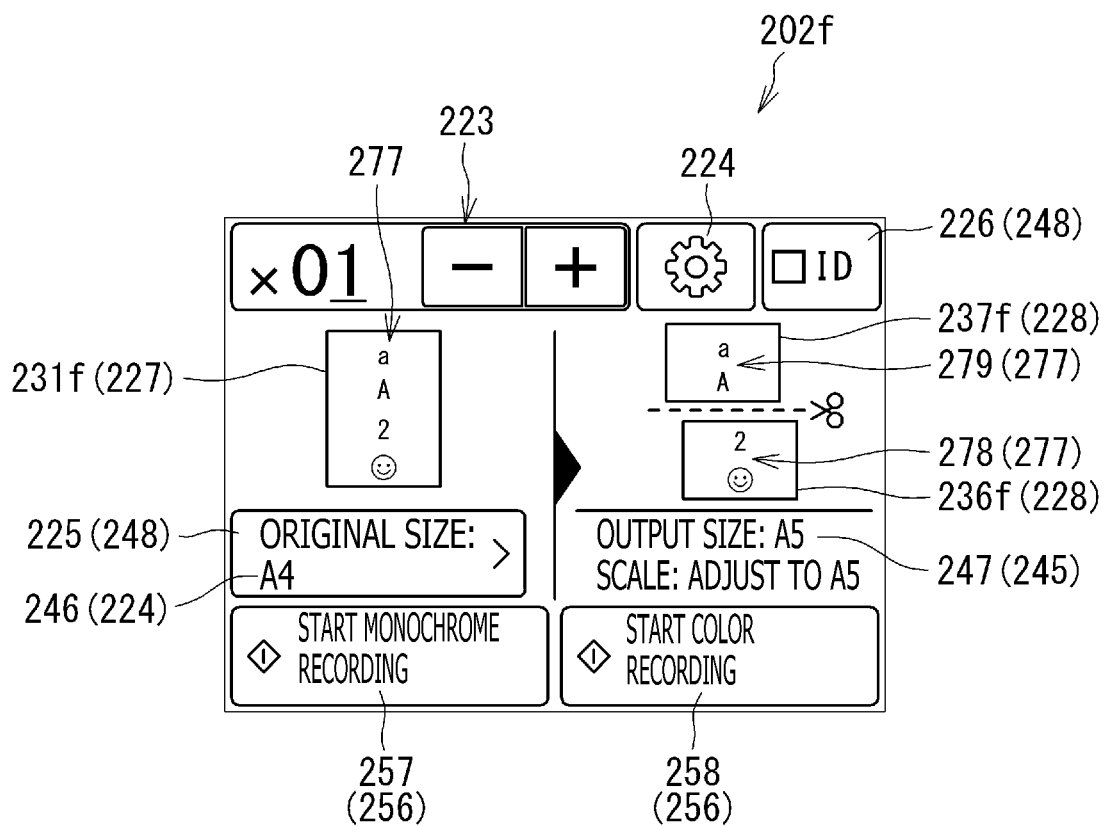
FIG. 13 is a diagram showing another first screen in an image recording apparatus according to a second modification.

As shown in FIG. 13, a first screen 202f of the image recording apparatus 10 according to the second modification includes the first icon 227 displayed as a vertically oriented first rectangle 231f and the second icon 228 displayed as two rectangles, namely, a horizontally oriented second rectangle 236f and a horizontally oriented third rectangle 237f. The first display 277 is displayed inside the first rectangle 231E A portion 278 of the first display 277 is displayed inside the second rectangle 236f, and a remaining portion 279 of the first display 277 other than the portion 278 is displayed inside the third rectangle 237f.

In the second modification, as in the first modification, inside the first rectangle 231f, the first display 277 including the characters, the number, and the symbol or figure arranged in a vertical row with their upper sides oriented upward are displayed. Inside second rectangle 236f, the portion 278, which is the number and the symbol or figure in the lower half of the first display 277 when the upper side is oriented upward, is displayed. Inside the third rectangle 237f, the remaining portion 279, which is the two characters in the upper half of the first display 277 when the upper side is oriented upward, is displayed.

Effects of Second Modification

Figure 14:
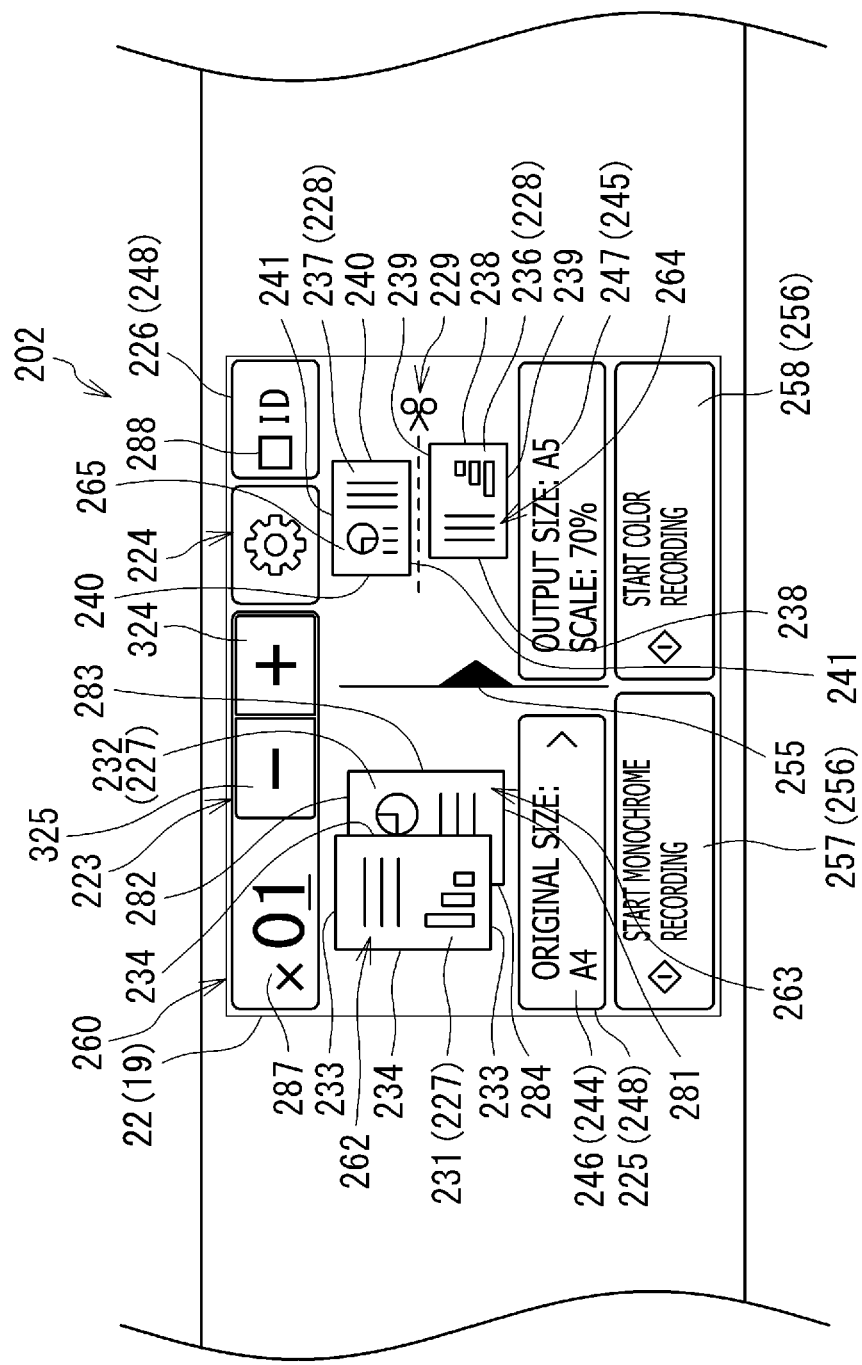
FIG. 14 is a diagram showing a touch panel of an image recording apparatus according to a third modification.

Before executing the image recording process and the cutting process, the first display 277 is displayed in the first icon 227, the portion 278 of the first display 277 is displayed inside the second rectangle 236f of the second icon 228, and the remaining portion 279 of the first display 277 is displayed inside the third rectangle 237f Therefore, the user can recognize that the image on the original 9 will be recorded over a plurality of cut recording sheets 8. Since the orientations of the first display 277, the portion 278 of the first display 277 and the remaining portion 279 of the first display 277 can be recognized, the user can recognize in which orientation the image on the original 9 will be recorded over a plurality of cut recording sheets 8 from the images displayed in the first rectangle 231f, the second rectangle 236f and the third rectangle 237f Third Modification In the above-described embodiment, the operation interface 19, that is, the physical buttons 19a, 19b and 19c, and the LCD 22 are provided on the upper portion of the front surface of the image recording apparatus 10, and the screen is operated through the operation of the operation interface 19. However, as shown in FIG. 14, the operation interface 19 may further include, or the physical buttons 19a, 19b and 19c may be replaced with, a touch panel 260 overlayed on the LCD 22.

In this case, the user operates the touch panel 260 while viewing the first screen 202 displayed on the LCD 22 to operate the image recording apparatus 10. Specifically, the user selects a desired icon by touching a portion the touch panel 260 above the desired icon.

Effects of Third Modification

By providing the operation interface 19 with the touch panel 260, the user can intuitively operate the image recording apparatus 10 and thus the operability of the image recording apparatus 10 improves.

Fourth Modification

Figure 15:
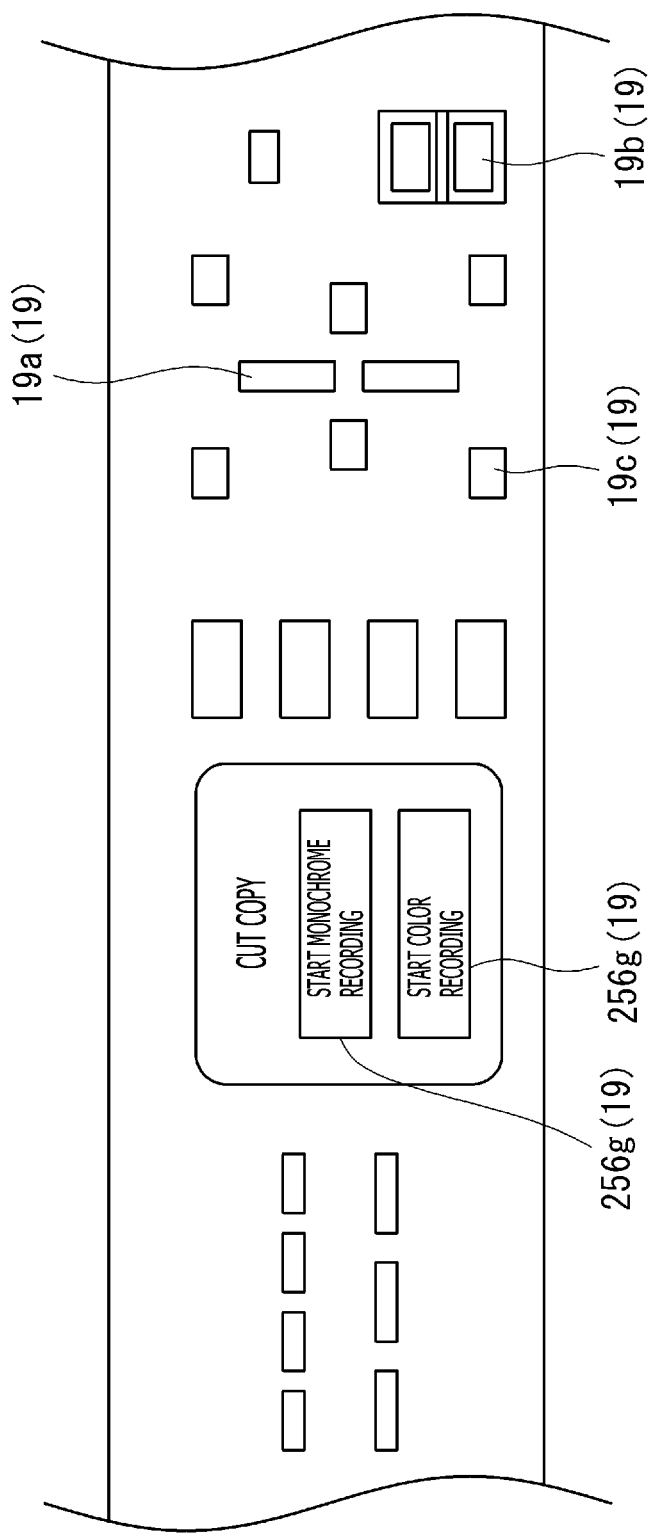
FIG. 15 is a diagram showing physical buttons configured to receive a user operation for starting recording in an image recording apparatus according to a fourth modification.

In the embodiment describe above, the first screen 202 includes the recording start receiving section 256 configured to receive a user operation for starting the reading process, the image recording process, and the cutting process. However, aspects of the present disclosure are not limited to this configuration. For example, as shown in FIG. 15, the recording start receiving section may be physical buttons 256g not displayed on the screen, and the reading process, the image recording process, and the cutting process may be started when the user depresses one of the physical buttons 256g. That is, the physical buttons 256g may be part of the operation interface 19.

Effects of Fourth Modification

The user can easily start the reading process, the image recording process, and the cutting process by one operation, that is, by depressing one of the physical buttons 256g. Therefore, the user's operation time and labor can be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the scanner 12 includes the first CIS 85 and the second CIS 88 and executes the reading process on both the first surface 117 and the second surface 118 of the original 9. However, the scanner 12 may read only the first surface 117 of the original 9 and may include only the first CIS 85.

In the above-described embodiment, the cutter 45 cuts the recording sheet 8 with the blade 83 and the fixed blade 95. However, the structure of the cutter 45 is not particularly limited as long as the cutter 45 can cut the recording sheet 8 along the lateral direction 55, 56. For example, in the cutter 45, instead of providing the blade 83 and the fixed blade 95, two disk-shaped rotary blades such as the blade 83 may be mounted on the blade carriage 82.

In the above-described embodiment, the A4-sized recording sheet 8 is cut at the center position in the conveying direction 7 to form two A5-sized recording sheets, but the size of the recording sheet 8 and the position where the recording sheet 8 is cut are not limited to the above. The size of the recording sheet 8 to be cut may be A3, B4, B5 or the like other than A4, or sizes other than the standard sizes. The position where the recording sheet 8 is cut may be a position shifted from the center position in the conveying direction 7 of the recording sheet 8. That is, the sizes of the cut recording sheets may be different from each other. The position where the recording sheet 8 is cut is not limited to one position. For example, the recording sheet 8 may be cut at two or more positions. In this case, in addition to the first rectangle 231 and the second rectangle 236, the second icon 228 may further include a third rectangle, a fourth rectangle and so on.

In the above-described embodiment, an image of the A4-sized original 9 subjected to the reading process is recorded on the A4-sized recording sheet 8 and then the recording sheet 8 on which the image is recorded is cut into two A5-sized sheets. However, the order of the processes is not limited to the above. For example, the A4-sized recording sheet 8 may be cut into two A5-sized recording sheets 8 by the cutting process, and then the image of the original 9 subjected to the reading process may be recorded on each of the recording sheets 8. Alternatively, the image of the original 9 subjected to the reading process may be recorded on half of the A4-sized recording sheet 8 before being subjected to the cutting process, and then the recording sheet 8 may be subjected to the cutting process to divide into an A5-sized recording sheet 8 on which the image has been recorded and an A5-sized recording sheet 8 on which the image has not yet been recorded, and then the remaining image of the original 9 may be recorded on the A5-sized recording sheet 8 on which the image has not yet been recorded.

In the above-described embodiment, the reading process, the image recording process, and the cutting process are executed after the displaying process. However, the order is not limited to the above. For example, the displaying process may be executed after the reading process and before the image recording process and the cutting process.

In the above-described embodiment, the first icon 227 displays the original 9 of which image is to be recorded as the first rectangle 231 and the other rectangle 232 on the first screen 202. However, aspects of the present disclosure are not limited to the above. The first icon 227 may display only the first page of the original 9 as the first rectangle.

In the above-described embodiment, the second icon 228 is formed by displaying the recording sheets 8 after being subjected to the cutting process as the second rectangle 236 and the third rectangle 237 on the first screen 202. However, aspects of the present disclosure are not limited to the above. For example, the recording sheet 8 may be cut into two or more recording sheets 8 by the cutter 45, and the second icon 228 may be formed by the second rectangle 236, the third rectangle 237, and other rectangles displayed to represent the other cut recording sheets 8.

In the above-described embodiment, the third icon 229 is imitates the shape of a pair of scissors. However, the shape of the third icon 229 is not limited to the whole shape of a pair of scissors. For example, the third icon 229 may imitate shapes of blades which are parts of a pair of scissors. In addition, the third icon 229 may also imitate a shape of a blade or the like instead of a pair of scissors.

In the above-described embodiment, the controller 100 displays the first screen 202 when the user performs the operation to execute the reading process, the image recording process, and the cutting process on the function selection screen 200. However, aspects of the present disclosure are not limited to the above configuration. For example, when the user performs an operation to execute the reading process, the image recording process, and the cutting process on the function selection screen 200, the other first screens 202a, 202b, 202c, and 202d may be displayed.

In the above-described embodiment, the second size change icon 226 receives the command to set the size of the original 9 to the size of an ID card. However, aspects of the present disclosure are not limited to the above. The size of the original 9 that can be set by the second size change icon 226 may be a size of a card having a size different from that of the ID card.

In the above-described embodiment, the first screen 202 includes the first size information display 244 and the second size information display 245 in the lower stage. However, aspects of the present disclosure are not limited to the above. For example, other information such as print orientation and image quality may be displayed on the first screen 202.

In the above-described embodiment, the second rectangle 236a is displayed as a rectangle, and the third rectangle 237a is displayed as a portion of a rectangle with one long side 272 and the portions 273 of two short sides. However, either one of the second rectangle 236a and the third rectangle 237a may be displayed as a portion of a rectangle. That is, the second rectangle 236a may be displayed with one long side and portions of two short sides, and the third rectangle 237a may be displayed as a rectangle.

Each screen displayed on the LCD 22 of the above-described image recording apparatus 10 need not necessarily be displayed on the image recording apparatus 10, but may be displayed on a conventionally-known external information device such as a computer, a smartphone, or a tablet connected to the image recording apparatus 10 by wire or wireless connection. That is, the screens 200, 200a, 200b, 201, 202, 202a, 202b, 202c, 202d, 202e, 202f, 250, and 300 shown in FIGS. 6 to 14 may be displayed on a display or the like of an external information device, and the user may be able to select and execute each icon using an input device such as a mouse, a keyboard, or a touch panel.

The scanner 12 is an example of a reader according to aspects of the present disclosure. The original 9 is an example of a medium to be read according to aspects of the present disclosure. The recording sheet 8 is an example of a sheet according to aspects of the present disclosure. The LCD 22 is an example of a display according to aspects of the present disclosure. The recording engine 17 is an example of an image recording engine according to aspects of the present disclosure. The first surface 117 is an example of a front surface according to aspects of the present disclosure. The second surface 118 is an example of a back surface according to aspects of the present disclosure.

What is claimed is:

1. An image recording apparatus, comprising:
    a conveyor configured to convey a sheet in a conveying direction;
    an image recording engine configured to record an image on the sheet conveyed by the conveyor;
    a cutter configured to cut the sheet;
    a reader configured to read an image on a medium to be read;
    an operation interface configured to receive a user operation;
    a display; and
    a controller including hardware,
    wherein the controller executes:
        reading an image on the medium to be read with the reader;
        recording the image which is read in the reading on the sheet with the image recording engine;
        cutting the sheet at a prescribed position in the conveying direction with the cutter; and
        displaying a first screen on the display before executing the reading, the recording, and the cutting,
    wherein the first screen includes a first icon comprising a first rectangle, the first rectangle representing the medium to be read and a second icon comprising at least portions of at least two rectangles including a second rectangle and a third rectangle, the at least portions representing sheets cut by the cutter and output by the image recording apparatus.

2. The image recording apparatus according to claim 1, wherein the first screen is configured to receive a user operation for starting the reading, the recording, and the cutting.

3. The image recording apparatus according to claim 2, wherein the:
    first screen comprises a first recording start icon configured to receive a user operation for starting the recording with a color image; and
    a second recording start icon configured to receive a user operation for starting the recording with a monochrome image.

4. The image recording apparatus according to claim 1, wherein the operation interface includes a touch panel.

5. The image recording apparatus according to claim 1, wherein the operation interface includes physical buttons including:
    a first recording start button configured to receive a user operation for starting the recording with a color image; and
    a second recording start button configured to receive a user operation for starting the recording with a monochrome image.

6. The image recording apparatus according to claim 1, wherein, in the second icon, the third rectangle is disposed such that short sides of the third rectangle are parallel to short sides of the second rectangle, and is offset from the second rectangle in a direction in which long sides of the second rectangle extends.

7. The image recording apparatus according to claim 1, wherein, in the second icon, the third rectangle is spaced apart from the second rectangle in a direction in which the short sides of the second rectangle extend, and further includes a third icon positioned between the second rectangle and the third rectangle, and
    wherein the third icon imitates at least a portion of a pair of scissors.

8. The image recording apparatus according to claim 1, wherein the first screen further includes another icon, and wherein the another icon is an arrow pointing from the first icon toward the second icon.

9. The image recording apparatus according to claim 1, wherein the first screen includes a first size information display indicating a size of the medium to be read, and a second size information display indicating a size of the sheet after being cut.

10. The image recording apparatus according to claim 9, wherein the first screen further includes an area configured to receive a user operation for changing a first size indicated by the first size information display, and
wherein the first size information display is positioned in the area.

11. The image recording apparatus according to claim 10, wherein the area includes a first size change icon configured to receive a user operation for displaying a second screen in which the size of the medium to be read can be selected, and a second size change icon configured to receive a user operation for setting the size of the medium to be read to a size of a card.

12. The image recording apparatus according to claim 10, wherein a ratio of short sides to long sides in the first rectangle is the same as a ratio of short sides to long sides of the first size.

13. The image recording apparatus according to claim 1, wherein, in the first icon, a first display including a character, a number, a symbol, a figure, or any combination thereof and of which orientation is recognizable is displayed inside the first rectangle, and
wherein, in the second icon, the first display is displayed inside the second rectangle, the third rectangle, or both the second rectangle and the third rectangle.

14. The image recording apparatus according to claim 1, wherein, in the first icon, a first display including a character, a number, a symbol, a figure, or any combination thereof and of which orientation is recognizable is displayed inside the first rectangle, and
wherein, in the second icon, only a portion of the first display is displayed inside the second rectangle, and a remaining portion other than the portion of the first display is displayed inside the third rectangle.

15. The image recording apparatus according to claim 1, wherein each of the second rectangle and the third rectangle is smaller than the first rectangle.

16. The image recording apparatus according to claim 1, wherein lengths of long sides of the second rectangle and the third rectangle are the same as a length of short sides of the first rectangle.

17. The image recording apparatus according to claim 1, wherein:
the first rectangle has a square shape with rounded corners,
in the second icon, the entire second rectangle is displayed, and one long side and portions of two short sides of the third rectangle are recognizably displayed,
a first image is displayed inside the first rectangle,
the first image and a second image different from the first image are displayed inside the second rectangle,
the reading includes reading an image on a front surface of the medium to be read and reading an image on a back surface of the medium to be read, and
in the recording, the controller records the image on the front surface and the image on the back surface on one of the cut sheets.

* * * * *